(12) United States Patent
Chatterjee et al.

(10) Patent No.: US 10,370,564 B2
(45) Date of Patent: Aug. 6, 2019

(54) ADHESIVE COMPOSITIONS COMPRISING A SILSESQUIOXANE POLYMER CROSSLINKER, ARTICLES AND METHODS

(71) Applicant: 3M INNOVATIVE PROPERTIES COMPANY, St. Paul, MN (US)

(72) Inventors: Joon Chatterjee, Bloomington, MN (US); Jitendra Rathore, Woodbury, MN (US); Babu N. Gaddam, Woodbury, MN (US); Jayshree Seth, Woodbury, MN (US); Corinne E. Lipscomb, St. Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 180 days.

(21) Appl. No.: 15/306,200

(22) PCT Filed: Jun. 8, 2015

(86) PCT No.: PCT/US2015/034669
§ 371 (c)(1),
(2) Date: Oct. 24, 2016

(87) PCT Pub. No.: WO2015/195391
PCT Pub. Date: Dec. 23, 2015

(65) Prior Publication Data
US 2017/0321088 A1 Nov. 9, 2017

Related U.S. Application Data

(60) Provisional application No. 62/014,802, filed on Jun. 20, 2014.

(51) Int. Cl.
*C09J 4/06* (2006.01)
*C09J 11/04* (2006.01)
(Continued)

(52) U.S. Cl.
CPC .............. *C09J 4/06* (2013.01); *C08F 220/10* (2013.01); *C08K 5/101* (2013.01); *C09J 11/04* (2013.01);
(Continued)

(58) Field of Classification Search
None
See application file for complete search history.

(56) References Cited

U.S. PATENT DOCUMENTS

3,775,452 A  11/1973  Karstedt
4,351,875 A  9/1982  Arkens
(Continued)

FOREIGN PATENT DOCUMENTS

CN  1827668  9/2006
CN  1887921  1/2007
(Continued)

OTHER PUBLICATIONS

Aldrich Data Sheet (Year: 2018).*
(Continued)

*Primary Examiner* — Frank D Ducheneaux
(74) *Attorney, Agent, or Firm* — Carolyn A. Fischer

(57) ABSTRACT

Pressure sensitive adhesive compositions are described comprising at least one low Tg ethylenically unsaturated monomer, and at least one silsesquioxane polymer crosslinker comprising a plurality of ethylenically unsaturated groups. The low Tg ethylenically unsaturated monomer typically has a Tg no greater than 10° C. In some embodiments, the composition comprises at least 50, 55, 60, 65, or 70 wt-% of low Tg ethylenically unsaturated monomer. The low Tg ethylenically unsaturated monomer is typically an alkyl (meth)acrylate comprising 4 to 20 carbon atoms. In another embodiment, an adhesive composition is described comprising a syrup. The syrup comprising i) a free-radically
(Continued)

polymerizable solvent monomer; ii) a solute (meth)acrylic polymer comprising polymerized units derived from one or more alkyl (meth)acrylate monomers, and iii) at least one silsesquioxane polymer crosslinker comprising a plurality of ethylenically unsaturated groups. The free-radically polymerizable solvent monomer, polymerized units of the solute (meth)acrylic polymer, or a combination thereof comprise a low Tg ethylenically unsaturated monomer. Also described are pressure sensitive adhesive articles and method of preparing adhesive articles.

18 Claims, 1 Drawing Sheet

(51) Int. Cl.
   C08F 220/10      (2006.01)
   C08G 77/442     (2006.01)
   C09J 133/06     (2006.01)
   C09J 183/10     (2006.01)
   C08K 5/101      (2006.01)
(52) U.S. Cl.
   CPC ........... *C09J 133/06* (2013.01); *C09J 183/10* (2013.01); *C08G 77/442* (2013.01); *C09J 2201/606* (2013.01); *C09J 2205/106* (2013.01); *C09J 2433/00* (2013.01); *C09J 2483/00* (2013.01)

(56) References Cited

U.S. PATENT DOCUMENTS

| | | | |
|---|---|---|---|
| 4,415,615 | A | 11/1983 | Esmay |
| 4,510,094 | A | 4/1985 | Drahnak |
| 4,530,879 | A | 7/1985 | Drahnak |
| 4,535,485 | A | 8/1985 | Ashman |
| 4,600,484 | A | 7/1986 | Drahnak |
| 4,723,978 | A | 2/1988 | Clodgo |
| 4,732,934 | A | 3/1988 | Hathaway |
| 4,761,358 | A | 8/1988 | Hosoi |
| 4,788,252 | A | 11/1988 | De Boer |
| 4,879,362 | A | 11/1989 | Morgan |
| 4,885,209 | A | 12/1989 | Lindner |
| 4,889,901 | A | 12/1989 | Shama |
| 4,948,837 | A | 8/1990 | Wittmann |
| 4,963,619 | A | 10/1990 | Wittmann |
| 4,997,260 | A | 3/1991 | Honjo |
| 5,030,699 | A | 7/1991 | Motoyama |
| 5,057,577 | A | 10/1991 | Matsuo |
| 5,073,595 | A | 12/1991 | Almer |
| 5,145,886 | A | 9/1992 | Oxman |
| 5,178,947 | A | 1/1993 | Charmot |
| 5,188,899 | A | 2/1993 | Matsumoto |
| 5,212,237 | A | 5/1993 | Siol |
| 5,219,931 | A | 6/1993 | Siol |
| 5,223,586 | A | 6/1993 | Mautner |
| 5,278,451 | A | 1/1994 | Adachi |
| 5,360,878 | A | 11/1994 | Shen |
| 5,506,279 | A | 4/1996 | Babu |
| 5,602,221 | A | 2/1997 | Bennett |
| 5,609,925 | A | 3/1997 | Camilletti |
| 5,695,678 | A | 12/1997 | Edamura |
| 5,773,485 | A | 6/1998 | Bennett |
| 5,902,836 | A | 5/1999 | Bennett |
| 6,376,078 | B1 | 4/2002 | Inokuchi |
| 6,624,214 | B2 | 9/2003 | Zimmer |
| 6,627,314 | B2 | 9/2003 | Matyjaszewski |
| 6,743,510 | B2 | 6/2004 | Ochiai |
| 6,852,781 | B2 | 2/2005 | Savu |
| 6,927,301 | B2 | 8/2005 | Laine |
| 7,056,840 | B2 | 6/2006 | Miller |
| 7,081,295 | B2 | 7/2006 | James |
| 7,241,437 | B2 | 7/2007 | Davidson |
| 7,385,020 | B2 | 6/2008 | Anderson |
| 7,488,539 | B2 | 2/2009 | Kozakai |
| 7,723,438 | B2 | 5/2010 | Hedrick |
| 7,976,585 | B2 | 7/2011 | Cremer |
| 7,985,523 | B2 | 7/2011 | Zhou |
| 8,012,583 | B2 | 9/2011 | Wu |
| 8,071,132 | B2 | 12/2011 | Adair |
| 8,084,177 | B2 | 12/2011 | Zhou |
| 8,168,357 | B2 | 5/2012 | Wu |
| 8,173,342 | B2 | 5/2012 | Wu |
| 8,323,803 | B2 | 12/2012 | Wu |
| 8,329,301 | B2 | 12/2012 | Wu |
| 8,431,220 | B2 | 4/2013 | Wu |
| 8,758,854 | B2 | 6/2014 | Ishii |
| 2004/0166077 | A1 | 8/2004 | Toumi |
| 2004/0247549 | A1 | 12/2004 | Lu |
| 2005/0025820 | A1 | 2/2005 | Kester |
| 2005/0215807 | A1 | 9/2005 | Morimoto |
| 2007/0073024 | A1 | 3/2007 | Wariishi |
| 2007/0167552 | A1 | 7/2007 | Stoeppelmann |
| 2007/0213474 | A1 | 9/2007 | Ebenhoch |
| 2008/0045631 | A1 | 2/2008 | Henn |
| 2008/0051487 | A1* | 2/2008 | Kumon ................ C08F 283/12 522/146 |
| 2008/0057431 | A1 | 3/2008 | Lai |
| 2008/0119120 | A1 | 5/2008 | Zuniga |
| 2008/0254077 | A1 | 10/2008 | Prigent |
| 2008/0279901 | A1 | 11/2008 | Prigent |
| 2008/0286467 | A1 | 11/2008 | Allen |
| 2009/0162650 | A1 | 6/2009 | Hong |
| 2009/0197071 | A1 | 8/2009 | Cramail |
| 2009/0215927 | A1 | 8/2009 | Mohite |
| 2009/0312457 | A1 | 12/2009 | Tokumitsu |
| 2010/0280151 | A1 | 11/2010 | Nguyen |
| 2011/0045387 | A1 | 2/2011 | Allen |
| 2011/0054074 | A1 | 3/2011 | Jonschker |
| 2011/0083887 | A1 | 4/2011 | Brock |
| 2011/0117145 | A1 | 5/2011 | Inokuchi |
| 2011/0223404 | A1 | 9/2011 | Wu |
| 2012/0132108 | A1 | 5/2012 | Ishihara |
| 2012/0205315 | A1 | 8/2012 | Liu |
| 2012/0252980 | A1* | 10/2012 | Erdogan-Haug ...... C08F 265/06 525/293 |
| 2012/0288692 | A1 | 11/2012 | Broyles |
| 2012/0298574 | A1 | 11/2012 | Kang |
| 2012/0329898 | A1* | 12/2012 | Weikel ................ C08F 220/18 522/33 |
| 2013/0101934 | A1 | 4/2013 | Chiba |
| 2013/0102733 | A1 | 4/2013 | Chen |
| 2013/0139963 | A1 | 6/2013 | Lee |
| 2013/0318863 | A1 | 12/2013 | Chang |
| 2013/0343969 | A1 | 12/2013 | Bromberg |
| 2014/0023855 | A1 | 1/2014 | Masuda |
| 2014/0030441 | A1 | 1/2014 | Nagai |
| 2014/0135413 | A1 | 5/2014 | Yoo |
| 2014/0178698 | A1 | 6/2014 | Rathore |
| 2017/0362399 | A1* | 12/2017 | Lipscomb ............... B32B 27/08 |

FOREIGN PATENT DOCUMENTS

| | | |
|---|---|---|
| CN | 101376812 | 3/2009 |
| CN | 101550217 | 10/2009 |
| CN | 101717565 | 6/2010 |
| CN | 101724394 | 6/2010 |
| CN | 101781390 | 7/2010 |
| CN | 102432920 | 5/2012 |
| CN | 102532554 | 7/2012 |
| CN | 102585073 | 7/2012 |
| CN | 102718930 | 10/2012 |
| CN | 103012689 | 4/2013 |
| CN | 103030752 | 4/2013 |
| CN | 103113812 | 5/2013 |
| CN | 103173041 | 6/2013 |
| CN | 103275273 | 9/2013 |
| CN | 103289021 | 9/2013 |
| EP | 0254418 | 1/1988 |
| EP | 0315226 | 5/1989 |
| EP | 0373941 | 6/1990 |
| EP | 0398701 | 11/1990 |

(56) References Cited

FOREIGN PATENT DOCUMENTS

| | | |
|---|---|---|
| EP | 0420155 | 4/1991 |
| EP | 0420585 | 4/1991 |
| EP | 0459257 | 12/1991 |
| EP | 0556953 | 8/1993 |
| EP | 0958805 | 11/1999 |
| EP | 2155761 | 2/2010 |
| JP | S55-111148 | 8/1980 |
| JP | S62-124159 | 6/1987 |
| JP | S62-130807 | 6/1987 |
| JP | S62-255957 | 11/1987 |
| JP | S63-291962 | 11/1988 |
| JP | 2541566 | 1/1989 |
| JP | 01090201 | 4/1989 |
| JP | H01-096265 | 4/1989 |
| JP | S64-90201 | 4/1989 |
| JP | H01-195458 | 8/1989 |
| JP | H02-233537 | 9/1990 |
| JP | H03-002808 | 1/1991 |
| JP | H03-154007 | 7/1991 |
| JP | H04-050243 | 2/1992 |
| JP | H04-110351 | 4/1992 |
| JP | 04178411 | 6/1992 |
| JP | H04-173863 | 6/1992 |
| JP | H04-175370 | 6/1992 |
| JP | H04-178411 | 6/1992 |
| JP | H05-271362 | 10/1993 |
| JP | H08-134308 | 5/1996 |
| JP | H11-060931 | 3/1999 |
| JP | H11-116681 | 4/1999 |
| JP | 2000-063674 | 2/2000 |
| JP | 2000-157928 | 6/2000 |
| JP | 2000-169591 | 6/2000 |
| JP | 2001-106925 | 4/2001 |
| JP | 2002-121536 | 4/2002 |
| JP | 2002-327030 | 11/2002 |
| JP | 2003-055459 | 2/2003 |
| JP | 2003-226835 | 8/2003 |
| JP | 3817192 | 9/2003 |
| JP | 2004-292541 | 10/2004 |
| JP | 2005-014293 | 1/2005 |
| JP | 2006-160880 | 6/2006 |
| JP | 2006-335978 | 12/2006 |
| JP | 2007-090865 | 4/2007 |
| JP | 2007-146148 | 6/2007 |
| JP | 2007-146150 | 6/2007 |
| JP | 2008-056751 | 3/2008 |
| JP | 2008-115302 | 5/2008 |
| JP | 2008-127405 | 6/2008 |
| JP | 2008-144053 | 6/2008 |
| JP | 2008-201908 | 9/2008 |
| JP | 2008-303358 | 12/2008 |
| JP | 2009-009045 | 1/2009 |
| JP | 2009-024077 | 2/2009 |
| JP | 2009-029893 | 2/2009 |
| JP | 2009-051934 | 3/2009 |
| JP | 2009-091466 | 4/2009 |
| JP | 2009-155496 | 7/2009 |
| JP | 2009-191120 | 8/2009 |
| JP | 2009-253203 | 10/2009 |
| JP | 2009-280706 | 12/2009 |
| JP | 2010-005613 | 1/2010 |
| JP | 2010-095619 | 4/2010 |
| JP | 2010-116442 | 5/2010 |
| JP | 2010-128080 | 6/2010 |
| JP | 2010-144153 | 7/2010 |
| JP | 2010-175798 | 8/2010 |
| JP | 2010-229303 | 10/2010 |
| JP | 2010-260881 | 11/2010 |
| JP | 2010-265410 | 11/2010 |
| JP | 2010-275521 | 12/2010 |
| JP | 2011-063482 | 3/2011 |
| JP | 2011-081123 | 4/2011 |
| JP | 2011-099074 | 5/2011 |
| JP | 2011-115755 | 6/2011 |
| JP | 2011-132087 | 7/2011 |
| JP | 2012-036335 | 2/2012 |
| JP | 2012-036336 | 2/2012 |
| JP | 2012-144661 | 8/2012 |
| JP | 2013-010843 | 1/2013 |
| JP | 2013-022791 | 2/2013 |
| JP | 2013-076075 | 4/2013 |
| JP | 2013-249371 | 12/2013 |
| JP | 2013-251103 | 12/2013 |
| JP | 2014-005363 | 1/2014 |
| JP | 2014-007058 | 1/2014 |
| KR | 2006-017891 | 2/2006 |
| KR | 2009-067315 | 6/2009 |
| KR | 2010-075235 | 7/2010 |
| KR | 2011-038471 | 4/2011 |
| KR | 2012-021926 | 3/2012 |
| KR | 2013-026991 | 3/2013 |
| KR | 2013-067401 | 6/2013 |
| WO | WO 2005-100426 | 10/2005 |
| WO | WO 2007-103654 | 9/2007 |
| WO | WO 2008-124080 | 10/2008 |
| WO | WO 2008-147072 | 12/2008 |
| WO | WO 2009-002660 | 12/2008 |
| WO | WO 2009-005880 | 1/2009 |
| WO | WO 2009-008452 | 1/2009 |
| WO | WO 2009-085926 | 7/2009 |
| WO | WO 2009-128441 | 10/2009 |
| WO | WO 2010-055632 | 5/2010 |
| WO | WO 2013-015469 | 1/2013 |
| WO | WO 2013-087365 | 6/2013 |
| WO | WO 2013-087366 | 6/2013 |
| WO | WO 2013-087368 | 6/2013 |
| WO | WO 2014-024379 | 2/2014 |
| WO | WO 2014-099699 | 6/2014 |
| WO | WO 2015-088932 | 6/2015 |
| WO | WO 2015-195268 | 12/2015 |
| WO | WO 2015-195355 | 12/2015 |

OTHER PUBLICATIONS

Human translation of JP 04178411 A to Matsui (Year: 1992).*
"Norrish Reaction", Wikipedia, [Retrieved from the Internet on Jun. 12, 2014], URL <http://en.wikipedia.orgiwiki/Norrish_reaction>, pp. 4.
Boardman, "($\eta^5$-Cyclopentadienyl) Trialkylplatinum Photohydrosilylation Catalysts. Mechanism of Active Catalyst Formation and Preparation of a Novel Bis (Silyl) Platinum Hydride," Organometallics, 1992, vol. 11, No. 12, pp. 4194-4201.
Burget, "Kinetic Study of the Photoactivated Hydrosilylation of Some $\beta$-Dicarbonyl Complexes of Trialkylplatinum (IV)", Journal of Photochemistry and Photobiology A: Chemistry, 1996, vol. 97, pp. 163-170.
Ciba, "Coating Effects Segment IRGACURE 651", 2001, 2pgs.
Dow, "Dow Corning (R) 2-7466 Resin", Material Data Sheet, 2013, 2pgs.
Jakuczek, "Well-defined core-shell structures based on silsesquioxane microgels: Grafting of polystyrene via ATRP and product characterization", Polymer, 2008, vol. 49, pp. 843-856.
Lewis, "Platinum(II) Bis($\beta$-Diketones) as Photoactivated Hydrosilation Catalysts", Inorganic Chemistry, 1995, vol. 34, No. 12, pp. 3182-3189.
Su, "New Photocurable Acrylic/Silsesquioxane Hybrid Optical Materials: Synthesis, Properties, and Patterning", Macromolecular Materials and Engineering, 2007, vol. 292, pp. 666-673.
Wang, "Photoactivated Hydrosilylation Reaction of Alkynes," Journal of Organometallic Chemistry, 2003, vol. 665, pp. 1-6.
International Search Report for PCT International Application No. PCT/US2015/034669, dated Sep. 29, 2015, 3pgs.

* cited by examiner

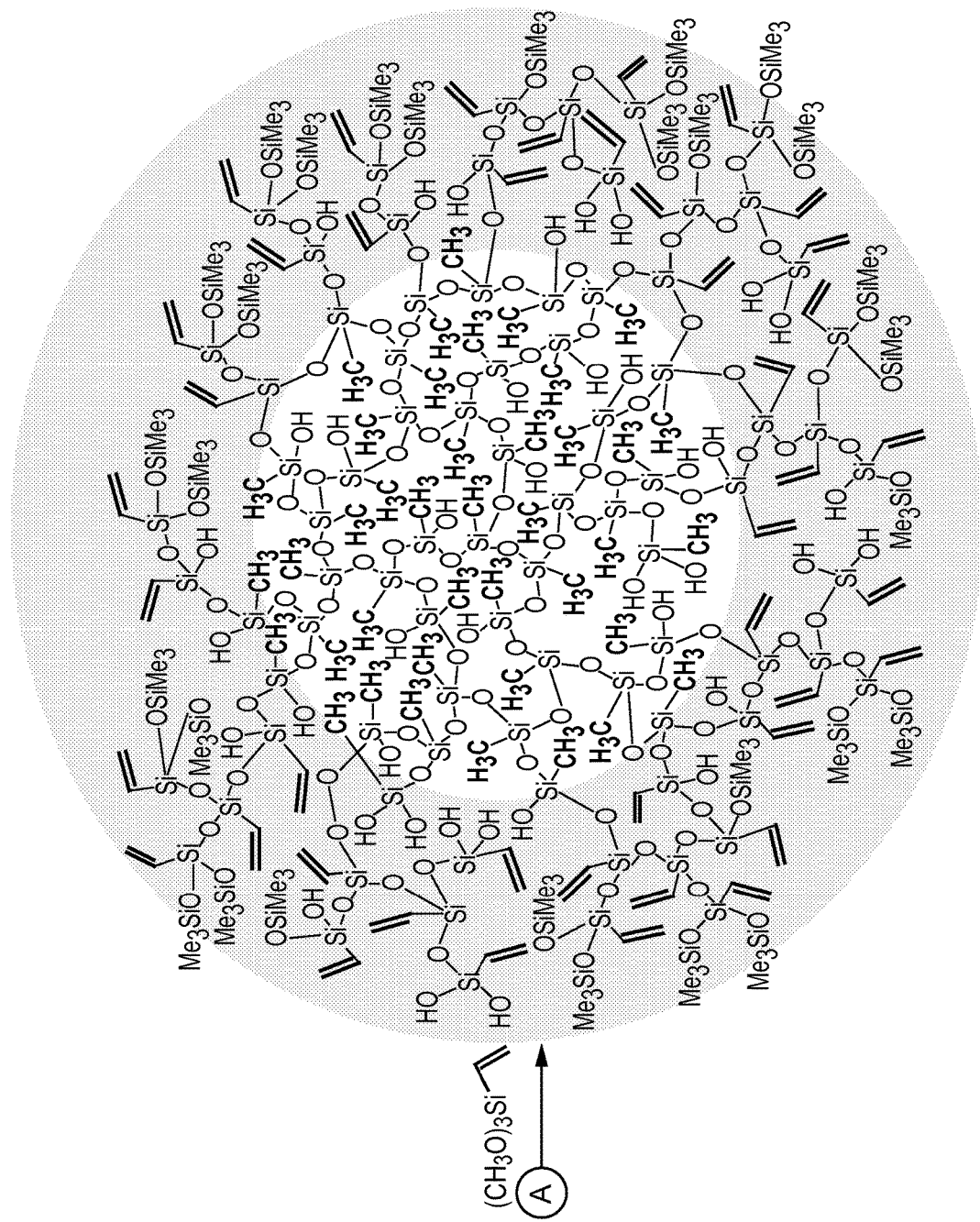

ADHESIVE COMPOSITIONS COMPRISING A SILSESQUIOXANE POLYMER CROSSLINKER, ARTICLES AND METHODS

CROSS REFERENCE TO RELATED APPLICATIONS

This application is a national stage filing under 35 U.S.C. 371 of PCT/US2015/034669, filed Jun. 8, 2015, which claims the benefit of U.S. Provisional Application No. 62/014,802, filed Jun. 20, 2014, the disclosure of which is incorporated by reference in its/their entirety herein.

SUMMARY

In one embodiment, a pressure sensitive adhesive composition is described comprising
at least one low Tg ethylenically unsaturated monomer, and
at least one silsesquioxane polymer crosslinker comprising a plurality of ethylenically unsaturated groups. The low Tg ethylenically unsaturated monomer typically has a Tg no greater than 10° C. In some embodiments, the composition comprises at least 50, 55, 60, 65, or 70 wt-% of low Tg ethylenically unsaturated monomer. The low Tg ethylenically unsaturated monomer is typically an alkyl (meth) acrylate comprising 4 to 20 carbon atoms.

The silsesquioxane polymer crosslinker typically comprises a three-dimensional branched network having the formula:

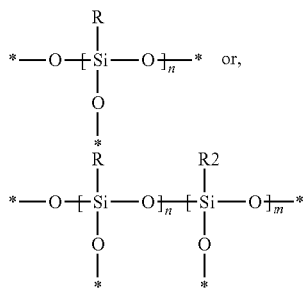

wherein:
the oxygen atom at the * is bonded to another Si atom within the three-dimensional branched network;
R is an organic group comprising an ethylenically unsaturated group;
R2 is an organic group that is not an ethylenically unsaturated group; and
n is at least 2 and m is at least 1.

The silsesquioxane polymer crosslinker may comprise a core comprising a first silsesquioxane polymer and an outer layer comprising a second (different) silsesquioxane polymer bonded to the core wherein the silsesquioxane polymer of the core, outer layer, or a combination thereof comprises ethylenically unsaturated groups.

In some embodiments, the silsesquioxane polymer crosslinker comprises terminal groups having the formula —Si $(R^3)_3$ wherein $R^3$ is independently selected from alkyl, aryl, aralkyl, or alkaryl; optionally further comprising substituents.

In favored embodiments, the ethylenically unsaturated groups of the silsesquioxane polymer are vinyl, vinyl ether, alkenyl or combinations thereof.

In another embodiment, an adhesive composition is described comprising a syrup. The syrup comprising i) a free-radically polymerizable solvent monomer; ii) a solute (meth)acrylic polymer comprising polymerized units derived from one or more alkyl (meth)acrylate monomers, and iii) at least one silsesquioxane polymer crosslinker comprising a plurality of ethylenically unsaturated groups. The free-radically polymerizable solvent monomer, polymerized units of the solute (meth)acrylic polymer, or a combination thereof comprise a low Tg ethylenically unsaturated monomer.

Also described are pressure sensitive adhesive articles and method of preparing adhesive articles.

BRIEF DESCRIPTION OF THE DRAWINGS

FIG. 1 is an illustrative schematic of a silsesquioxane polymer crosslinker.

DETAILED DESCRIPTION

The present disclosure describes adhesives that can be prepared from crosslinkable (e.g. syrup) compositions, as well as articles. In some embodiments, the adhesive is a pressure sensitive adhesive (PSA), prior to crosslinking. In other embodiments, the crosslinked adhesive is a pressure sensitive adhesive (PSA). A PSA generally provides a suitable balance of tack, peel adhesion, and shear holding power. Further, the storage modulus of a PSA at the application temperature, typically room temperature (25° C.), is generally less than $3 \times 10^6$ dynes/cm$^2$ (i.e. $3 \times 10^5$ Pa) at a frequency of 1 Hz. In some embodiments, the adhesive is a PSA at an application temperature that is greater than room temperature. For example, the application temperature may be 30, 35, 40, 45, 50, 55, or 65° C. In this embodiment, the storage modulus of the adhesive at room temperature (25° C.) can be greater than $3 \times 10^6$ dynes/cm$^2$ at a frequency of 1 Hz.

In other embodiments, the adhesive (e.g. syrup) composition may be structural adhesive or a polymer film. In this embodiment, the storage modulus of the crosslinked adhesive at the application temperature (e.g. 25° C.) is greater than or equal to $3 \times 10^5$ Pa at a frequency of 1 hertz (Hz) at a frequency of 1 Hz at the application temperature, (e.g. 25° C.)

"syrup composition" refers to a solution of a solute polymer in one or more solvent monomers, the composition having a viscosity from 100 to 8,000 cPs at 25° C. The syrup has a viscosity greater than the solvent monomer(s).

The term "alkyl" includes straight-chained, branched, and cyclic alkyl groups and includes both unsubstituted and substituted alkyl groups. Unless otherwise indicated, the alkyl groups typically contains from 1 to 30 or 1-20 carbon atoms. Examples of "alkyl" as used herein include, but are not limited to, methyl, ethyl, n-propyl, n-butyl, n-pentyl, isobutyl, t-butyl, isopropyl, n-octyl, 2-octyl, n-heptyl, ethylhexyl, cyclopentyl, cyclohexyl, cycloheptyl, adamantyl, and norbornyl, and the like. Unless otherwise noted, alkyl groups may be mono- or polyvalent.

The term heteroalkyl refers to an alkyl group, as just defined, having at least one catenary carbon atom (i.e. in-chain) replaced by a catenary heteroatom such as O, S, or N.

The term "aryl" refers to a substituent derived from an aromatic ring and includes both unsubstituted and substituted aryl groups. Examples of "aryl" include phenyl, halogenated phenyl, and the like.

The term "aralkyl" refers to a monovalent group that is an alkyl group substituted with an aryl group (e.g., as in a benzyl group). The term "alkaryl" refers to a monovalent group that is an aryl substituted with an alkyl group (e.g., as in a tolyl group). Unless otherwise indicated, for both groups, the alkyl portion often has 1 to 10 carbon atoms, 1 to 6 carbon atoms, or 1 to 4 carbon atoms and an aryl portion often has 6 to 20 carbon atoms, 6 to 18 carbon atoms, 6 to 16 carbon atoms, 6 to 12 carbon atoms, or 6 to 10 carbon atoms.

The term "alkylene" refers to a divalent group that is a radical of an alkane and includes groups that are linear, branched, cyclic, bicyclic, or a combination thereof. Unless otherwise indicated, the alkylene group typically has 1 to 30 carbon atoms. In some embodiments, the alkylene group has 1 to 20 carbon atoms, 1 to 10 carbon atoms, 1 to 6 carbon atoms, or 1 to 4 carbon atoms. Examples of alkylene groups include, but are not limited to, methylene, ethylene, 1,3-propylene, 1,2-propylene, 1,4-butylene, 1,4-cyclohexylene, and 1,4-cyclohexyldimethylene.

The term "arylene" refers to a divalent group that is aromatic and, optionally, carbocyclic. The arylene has at least one aromatic ring. Any additional rings can be unsaturated, partially saturated, or saturated. Optionally, an aromatic ring can have one or more additional carbocyclic rings that are fused to the aromatic ring. Unless otherwise indicated, arylene groups often have 6 to 20 carbon atoms, 6 to 18 carbon atoms, 6 to 16 carbon atoms, 6 to 12 carbon atoms, or 6 to 10 carbon atoms.

The term "aralkylene" refers to a divalent group that is an alkylene group substituted with an aryl group or an alkylene group attached to an arylene group. The term "alkarylene" refers to a divalent group that is an arylene group substituted with an alkyl group or an arylene group attached to an alkylene group. Unless otherwise indicated, for both groups, the alkyl or alkylene portion typically has from 1 to 20 carbon atoms, 1 to 10 carbon atoms, 1 to 6 carbon atoms, or 1 to 4 carbon atoms. Unless otherwise indicated, for both groups, the aryl or arylene portion typically has from 6 to 20 carbon atoms, 6 to 18 carbon atoms, 6 to 16 carbon atoms, 6 to 12 carbon atoms, or 6 to 10 carbon atoms.

The term "hydrolyzable group" refers to a group that can react with water having a pH of 1 to 10 under conditions of atmospheric pressure. The hydrolyzable group is often converted to a hydroxyl group when it reacts. The hydroxyl group often undergoes further reactions (e.g. condensation). Typical hydrolyzable groups include, but are not limited to, alkoxy, aryloxy, aralkyloxy, alkaryloxy, acyloxy, or halogen (directly boned to s silicon atom. As used herein, the term is often used in reference to one of more groups bonded to a silicon atom in a silyl group.

"Renewable resource" refers to a natural resource that can be replenished within a 100 year time frame. The resource may be replenished naturally or via agricultural techniques. The renewable resource is typically a plant (i.e. any of various photosynthetic organisms that includes all land plants, inclusive of trees), organisms of Protista such as seaweed and algae, animals, and fish. They may be naturally occurring, hybrids, or genetically engineered organisms. Natural resources such as crude oil, coal, and peat which take longer than 100 years to form are not considered to be renewable resources.

When a group is present more than once in a formula described herein, each group is "independently" selected unless specified otherwise.

Presently described are (e.g. pressure sensitive) adhesive compositions comprising at least one low Tg ethylenically unsaturated monomer and at least one silsesquioxane polymer crosslinker comprising a plurality of ethylenically unsaturated groups.

A silsesquioxane ("SSQ") is an organosilicon compound with the empirical chemical formula $R'SiO_{3/2}$ where Si is the element silicon, O is oxygen and R' is either hydrogen or an aliphatic or aromatic organic group that optionally further comprises an ethylenically unsaturated group. Thus, silsesquioxanes polymers comprise silicon atoms bonded to three oxygen atoms. Silsesquioxanes polymers that have a random branched structure are typically liquids at room temperature. Silsesquioxanes polymers that have a non-random structure like cubes, hexagonal prisms, octagonal prisms, decagonal prisms, and dodecagonal prisms are typically solids as room temperature.

The SSQ polymer crosslinker comprises a plurality of ethylenically unsaturated groups. The ethylenically unsaturated groups of the SSQ polymer are typically free-radically polymerizable groups such as vinyl ($H_2C=CH-$) including vinyl ethers ($H_2C=CHO-$) and alkenyl ($H_2C=CH(CH_2)_n-$, wherein $-(CH_2)_n-$ is alkylene as previously defined. The ethylenically unsaturated groups of the SSQ polymer may also be (meth)acryl such as (meth)acrylamide ($H_2C=CHCONH-$ and $H_2C=CH(CH_3)CONH-$) and (meth)acrylate($CH_2=CHCOO-$ and $CH_2=C(CH_3)COO-$). The term "(meth)acrylate" includes both methacrylate and acrylate.

Silsesquioxane polymers comprising a plurality of ethylenically unsaturated groups can be made by hydrolysis and condensation of hydrolyzable silane reactants, such as alkoxy silanes, that further comprise an ethylenically unsaturated group, as known in the art. See for example U.S. Publication No. 2014/0178698, and Provisional Patent Application Nos. 61/913,568, filed Dec. 9, 2014; 62/014,735, filed Jun. 20, 2014; and 62/014,778, filed Jun. 20, 2014; incorporated herein by reference. In some embodiments, the silsesquioxane polymer crosslinker can be a homopolymer, characterized as a three-dimensional branched network having the formula:

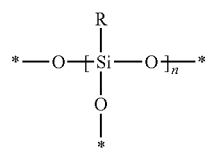

wherein R is an organic group comprising an ethylenically unsaturated group and the oxygen atom at the * is bonded to another Si atom within the three-dimensional branched network. In some embodiments, R has the formula Y—Z, as can be derived from a reactant Z—Y—Si($R^1$)$_3$, wherein $R^1$ is a hydrolyzable group, Y is a covalent bond (as depicted in the formula) or a divalent organic linking group, and Z is an ethylenically unsaturated group, as previously described.

Examples of Z—Y—Si($R^1$)$_3$ reactants include vinyltriethoxysilane, allyltriethoxysilane, allylphenylpropyltriethoxysilane, 3-butenyltriethoxysilane, docosenyltriethoxysilane, hexenyltriethoxysilane, and methacryloxylpropyltrimethoxyl silane.

In some embodiments, Y is a (e.g. $C_1$-$C_{20}$) alkylene group, a (e.g. $C_6$-$C_{12}$) arylene group, a (e.g. $C_6$-$C_{12}$)alk (e.g. $C_1$-$C_{20}$)arylene group, a (e.g. $C_6$-$C_{12}$)ar (e.g. $C_1$-$C_{20}$) alkylene group, or a combination thereof. Y may optionally further comprise (e.g. contiguous) oxygen, nitrogen, sulfur, silicon, or halogen substituents, and combinations thereof.

In some embodiments, Y does not comprise oxygen or nitrogen substituents that can be less thermally stable.

The number of polymerized units, n, is at least 2, 3, 4, 5, 6, 7, 8, 9, or 10. In some embodiments, n is at least 15, 20, 25, 30, 35, 40, 45, or 50. In some embodiments, n is no greater than 500, 450, 400, 350, 300, 250 or 200.

In other embodiments, the silsesquioxane polymer crosslinker can be a copolymer, characterized as a three-dimensional branched network having the formula:

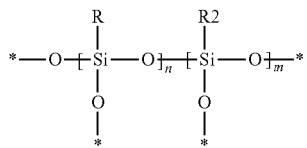

wherein R is an organic group comprising an ethylenically unsaturated group as previously described, R2 is an organic group lacking an ethylenically unsaturated group, the oxygen atom at the * is bonded to another Si atom within the three-dimensional branched network, and n is at least 2 and m is at least 1. In some embodiments, R2 has the formula Y—X, as can be derived from a reactant X—Y—Si(R$^1$)$_3$, wherein R$^1$ is a hydrolyzable group, Y is a covalent bond (as depicted in the formula) or a divalent organic linking group as previously described. X is hydrogen, a (monovalent) organic group such as alkyl, aryl, aralkyl, or alkaryl that may optionally comprise halogen or other substituents; or a reactive group that is not an ethylenically unsaturated group. X may optionally further comprise (e.g. contiguous) oxygen, nitrogen, sulfur, silicon, substituents. In some embodiments, X is an optionally halogenated (e.g. $C_1$-$C_{20}$) alkyl group such as (e.g. $C_4$-$C_6$) fluoroalkyl, a (e.g. $C_6$-$C_{12}$)aryl group such as phenyl, a (e.g. $C_6$-$C_{12}$)alk (e.g. $C_1$-$C_{20}$)aryl group, a (e.g. $C_6$-$C_{12}$)ar(e.g. $C_1$-$C_{20}$)alkyl group. In some embodiments, X comprises an epoxide ring.

Examples of X—Y—Si(R$^1$)$_3$ reactants include for example aromatic trialkoxysilanes such as phenyltrimethoxylsilane, ($C_1$-$C_{12}$) alkyl trialkoxysilanes such as methyltrimethoxylsilane, fluoroalkyl trialkoxysilanes such as nonafluorohexyltriethoxysilane, and trialkoxysilanes comprising a reactive group that is not an ethylenically unsaturated group such as glycidoxypropyltriethoxysilane; 3-glycidoxypropyltriethoxysilane 5,6-epoxyhexyltriethoxysilane; 2-(3,4-epoxycyclohexyl)ethyltriethoxysilane 3-(diphenylphosphino)propyltriethoxysilane; mercaptopropyltriethoxysilane; s-(octanoyl)mercaptopropyltriethoxysilane; 3-isocyanatopropyltriethoxysilane; hydroxy(polyethyleneoxy)propyl]triethoxysilane; hydroxymethyltriethoxysilane; 3-cyanopropyltriethoxysilane; 2-cyanoethyltriethoxysilane; and 2-(4-pyridylethyl)triethoxysilane.

Other commercially available X—Y—Si(R$^1$)$_3$ reactants include for example trimethylsiloxytriethoxysilane; p-tolyltriethoxysilane; tetrahydrofurfuryloxypropyltriethoxysilane; n-propyltriethoxysilane; (4-perfluorooctylphenyl)triethoxysilane; pentafluorophenyltriethoxysilane; nonafluorohexyltriethoxysilane; 1-naphthyltriethoxysilane; 3,4-methylenedioxyphenyltriethoxysilane; p-methoxyphenyltriethoxysilane; 3-isooctyltriethoxysilane; isobutyltriethoxysilane; (heptadecafluoro-1,1,2,2-tetrahydrodecyl)triethoxysilane; 3,5-dimethoxyphenyltriethoxysilane; (n,n-diethylaminomethyl)triethoxysilane;n-cyclohexylaminomethyl)triethoxysilane; 11-chloroundecyltriethoxysilane; 3-chloropropyltriethoxysilane; p-chlorophenyltriethoxysilane; chlorophenyltriethoxysilane; butylpoly(dimethylsiloxanyl)ethyltriethoxysilane; n,n-bis(2-hydroxyethyl)-3-aminopropyltriethoxysilane; benzyltriethoxysilane; and 2-[(acetoxy(polyethyleneoxy)propyl]triethoxysilane.

The reactant X—Y—Si(R$^1$)$_3$ and/or Z—Y—Si(R$^1$)$_3$ comprises three R$^1$ groups. In order to form a silsesquioxane polymer at least two of the R$^1$ groups are independently a hydrolyzable group. In typical embodiments, based on commercially available reactants, each R$^1$ group is independently a hydrolyzable group. In some embodiments of R$^1$, the hydrolyzable group is selected from alkoxy, aryloxy, aralkoxy, alkaryloxy, acyloxy, and halo. In some embodiments, R$^1$ is an alkoxy group.

SSQ copolymer crosslinkers can also be prepared from at least one X—Y—Si(R$^1$)$_3$ reactant and at least one Z—Y—Si(R$^1$)$_3$. For example, vinyltriethoxylsilane or allytriethoxysilane can be coreacted with an alkenylalkoxylsilane such as 3-butenyltriethoxysilane and hexenyltriethoxysilane. Representative copolymers include for example vinyl-co-nonafluorohexyl silsequioxane, vinyl-co-glycidoxylpropyl silsesquioxane, vinyl-co-phenyl silsesquioxane, vinyl-co-methyl silsesquioxane, vinyl-coethyl silsesquioxane, and vinyl-co-hydro silsesquioxane.

The inclusion of the silsesquioxane compound having an R2 group that is not an ethylenically unsaturated group can be used to enhance certain properties depending on the selection of the R2 group. For example, when R2 comprises an aromatic group such as phenyl, the thermal stability can be improved (relative to a homopolymer of vinyltrimethoxysilane). When R2 comprises a reactive group, such as an epoxy, improved hardness can be obtained (relative to a homopolymer of vinyltrimethoxysilane). Further, when R2 comprises a fluoroalkyl group, the hydrophobicity can be improved.

SSQ copolymer crosslinkers may comprise at least two different X groups (e.g. X' and X"), yet the same Y groups. Alternatively, the silsesquioxane polymers may comprise at least two different Y groups (e.g. Y' and Y"), yet the same X group. Further, the silsesquioxane polymers may comprise at least two reactants wherein both Y and X are different from each other. In such embodiment, R2 of the silsesquioxane polymer formula is independently an organic group lacking an ethylenically unsaturated group. Further, m represents the total number of repeat units independently lacking ethylenically unsaturated group.

SSQ copolymer crosslinkers can also be prepared from at least two Z—Y—Si(R$^1$)$_3$ reactants. For example, vinyltriethoxylsilane can be coreacted with allytriethoxysilane. In this embodiment, the silsesquioxane polymers may comprise at least two different Z groups (e.g. Z' and Z"), yet the same Y groups. Alternatively, the silsesquioxane polymers may comprise at least two different Y groups (e.g. Y' and Y"), yet the same Z group (e.g. vinyl). Further, the silsesquioxane polymers may comprise at least two reactants wherein both Y and Z are different from each other. In such embodiment, R is independently an organic group comprising an ethylenically unsaturated group (e.g. such as a vinyl group). Further, n represents the total number of repeat units independently comprising an ethylenically unsaturated group.

In yet other embodiments, the SSQ polymer crosslinker comprises a core comprising a first silsesquioxane polymer and an outer layer comprising a second silsesquioxane polymer bonded to the core wherein the silsesquioxane polymer of the core, outer layer, or a combination thereof comprises ethylenically unsaturated groups, as described in provisional application No. 62/014,778, filed Jun. 20, 2014.

The SSQ polymer of the outer layer is bonded to the SSQ polymer of the core via silicon atoms bonded to three oxygen atoms. The core or outer layer may comprise the SSQ homopolymers and copolymers previously described. In some embodiments, the core has a higher concentration of ethylenically unsaturated groups than the outer layer. In other embodiments, the outer layer has a higher concentration of ethylenically unsaturated groups than the core. In some embodiments, the core is substantially free of ethylenically unsaturated groups. The core and outer layer each comprise a three-dimensional branched network of a different silsesquioxane polymer. The silsesquioxane polymers of the core and outer layer may be homopolymers or copolymers. One representative SSQ polymer crosslinker, wherein the core is the reaction product of methyltrimethoxysilane and the outer layer is the reaction product of vinyltriethoxysilane, is depicted in FIG. 1.

During hydrolysis, the hydrolyzable groups are converted to a hydrolyzed group, such as —OH. The Si—OH groups react with each other to form silicone-oxygen linkages such that the majority of silicon atoms are bonded to three oxygen atoms. After hydrolysis, remaining hydrolyzed (e.g. —OH) groups are preferably further reacted with end-capping agents to convert the hydrolyzed (e.g. —OH) groups to —OSi($R^3$)$_3$. The silsesquioxane polymer crosslinker comprises terminal groups having the formula —Si($R^3$)$_3$ after end-capping.

Due to the end-capping, the SSQ polymer crosslinker typically comprises little or no OH groups. In some embodiments, the —OH groups are present in an amount of no greater than 5, 4, 3, 2, 1 or 0.5 wt-% of the SSQ polymer crosslinker. In some embodiments, the SSQ polymer crosslinker is free of —OH groups.

Various alkoxy silane end-capping agents are known. In some embodiments, the end-capping agent has the general structure $R^5$OSi($R^3$)$_3$ or O[Si($R^3$)$_3$]$_2$ wherein $R^5$ is a hydrolyzable group, as previously described and $R^3$ is independently a non-hydrolyzable group. Thus, in some embodiments $R^3$ generally lacks an oxygen atom or a halogen directly bonded to a silicon atom. $R^3$ is independently alkyl, aryl (e.g. phenyl), aralkyl, or alkaryl that optionally comprise halogen substituents (e.g. chloro, bromo, fluoro), aryl (e.g. phenyl), aralkyl, or alkaryl. The optionally substituted alkyl group may have a straight, branched, or cyclic structure. In some embodiments, $R^3$ is $C_1$-$C_{12}$ or $C_1$-$C_4$ alkyl optionally comprising halogen substituents. $R^3$ may optionally comprise (e.g. contiguous) oxygen, nitrogen, sulfur, or silicon substituents. In some embodiments, $R^3$ does not comprise oxygen or nitrogen substituents that can be less thermally stable.

A non-limiting list of illustrative end-capping agents and the resulting $R^3$ groups is as follows:

| End-capping agent | $R^3$ |
|---|---|
| n-butyldimethylmethoxysilane | n-butyldimethyl |
| t-butyldiphenylmethoxysilane | t-butyldiphenyl |
| 3-chloroisobutyldimethylmethoxysilane | 3-chloroisobutyldimethyl |
| phenyldimethylethoxysilane | phenyldimethyl |
| n-propyldimethylmethoxysilane | n-propyldimethyl |
| triethylethoxysilane | triethyl |
| trimethylmethoxysilane | trimethyl |
| triphenylethoxysilane | triphenyl |
| n-octyldimethylmethoxysilane | n-octyldimethyl |
| hexamethyldisiloxane | trimethyl |
| hexaethyldisiloxane | triethyl |
| 1,1,1,3,3,3-hexaphenyldisiloxane | triphenyl |
| 1,1,1,3,3,3-hexakis(4-(dimethylamino)phenyl) disiloxane | tri-[4-(dimethylamino)phenyl] |
| 1,1,1,3,3,3-hexakis(3-fluorobenzyl)disiloxane | tri-(3-fluorobenzyl) |

When the silsesquioxane polymer is further reacted with an end-capping agent to convert the hydrolyzed group, e.g. —OH, to —OSi($R^3$)$^3$ the silsesquioxane polymer crosslinker typically comprises a three-dimensional branched network having the formula:

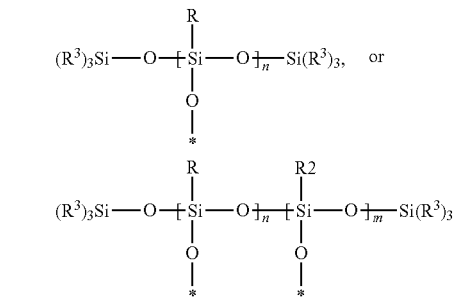

wherein:

the oxygen atom at the * is bonded to another Si atom within the three-dimensional branched network, R is an organic group comprising an ethylenically unsaturated group, R2 is an organic group that is not an ethylenically unsaturated group, $R^3$ is a non-hydrolyzable group (as previously described); and n is at least 2 and m is at least 1.

In one naming convention, the $R^3$ group derived the end-capping agent is included in the name of the SSQ polymer. For example poly(vinylsilsesquioxane) endcapped with ethoxytrimethylsilane or hexamethyldisiloxane may be named "trimethyl silyl poly(vinylsilsesquioxane)" and has the general formula:

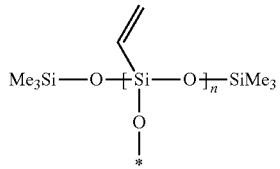

wherein the oxygen atom in the formula above at the * above is bonded to another Si atom within the three-dimensional branched network. Such three-dimensional branched network structure is depicted in FIG. 2.

The SSQ polymer crosslinker comprises at least two ethylenically unsaturated groups. Thus, n is at least 2, 3, 4, 5, 6, 7, 8, 9, or 10. In the case of SSQ copolymer crosslinkers comprising n and m units, m is at least 1, 2, 3, 4, 5, 6, 7, 8, 9, or 10. In some embodiments, n, m, or n+m is at least 15, 20, 25, 30, 35, 40, 45, or 50. In some embodiments, n or m, or n+m is no greater than 500, 450, 400, 350, 300, 250 or 200. Thus n+m can range up to 1000. When the SSQ polymer is prepared from one or more SSQ reactants, wherein all the reactants comprise an ethylenically unsaturated group, all (i.e. 100%) of the repeat units comprise an ethylenically unsaturated group. In some embodiments, n and m are selected such the polymer comprises at least 25, 30, 35, 40, 45, or 50 mol % of repeat units comprising ethylenically unsaturated group(s) R. In some embodiments, n and m are selected such the polymer comprises no greater than 95, 90, 85, 80, 75, 70, 65, 60, or 55 mol % of repeat units comprising ethylenically unsaturated group(s) R.

The ethylenically unsaturated groups of the SSQ polymer crosslinker are generally copolymerized with other ethylenically groups of the adhesive composition such as low Tg ethylenically unsaturated monomers or pendent ethylenically unsaturated groups of s solute (meth)acrylic polymer. The other ethylenically unsaturated monomer(s) typically also comprise free-radically polymerizable groups as previously described. In some embodiments, the free-radically polymerizable groups of the low Tg ethylenically unsaturated monomers and free-radically polymerizable solvent monomer are (meth)acryl monomers, such as (meth)acrylate.

The concentration of SSQ crosslinking polymer is typically at least 0.1, 0.2, 0.3, 0.4 or 0.5 wt-% and can range up to 15 or 20 wt-% of the (e.g. pressure sensitive) adhesive composition. However, as the concentration of such crosslinking polymer increases, the peel adhesion (180° to stainless steel) can decrease. Thus, in typically embodiments, the concentration of the SSQ crosslinking polymer is no greater than 10, 9, 8, 7, 6, or 5 wt-% and in some favored embodiments, no greater than 4, 3, 2, or 1 wt-%. When the SSQ polymer crosslinker comprises a relatively high number of repeat units that comprise ethylenically unsaturated groups, such as in the case of (trialkyl silyl) polyvinylsilsesquioxane homopolymer, small concentrations of SSQ polymer crosslinker can increase the shear holding power to 10,000+ minutes, However, when the SSQ polymer crosslinker comprises a lower number of repeat units that comprise ethylenically unsaturated groups, such as in the case of (trialkyl silyl) polyvinyl-co-ethyl-silsesquioxane copolymer, proportionately higher concentrations of SSQ copolymer crosslinker would be utilized to obtain comparable shear holding power.

The (e.g. pressure sensitive) adhesive composition may comprise a single SSQ polymer or a combination of two or more of such SSQ polymers. When the composition comprises a combination of SSQ polymers, the total concentration generally falls within the ranges just described.

In some embodiments, the polymer is a (meth)acrylic polymer and/or (e.g. pressure sensitive) adhesive comprising polymerized units derived from one or more (meth) acrylate ester monomers derived from a (e.g. non-tertiary) alcohol containing from 1 to 14 carbon atoms and preferably an average of from 4 to 12 carbon atoms. The (meth)acrylic polymer and/or (e.g. pressure sensitive) adhesive composition may also comprise one or more monomers (e.g. common to acrylic polymers and adhesives) such as a (meth) acrylic ester monomers (also referred to as (meth)acrylate acid ester monomers and alkyl(meth)acrylate monomers) optionally in combination with one or more other monomers such as acid-functional ethylenically unsaturated monomers, non-acid-functional polar monomers, and vinyl monomers.

Examples of monomers include the esters of either acrylic acid or methacrylic acid with non-tertiary alcohols such as ethanol, 1-propanol, 2-propanol, 1-butanol, 2-butanol, 1-pentanol, 2-pentanol, 3-pentanol, 2-methyl-1-butanol, 3-methyl-1-butanol, 1-hexanol, 2-hexanol, 2-methyl-1-pentanol, 3-methyl-1-pentanol, 2-ethyl-1-butanol, 3,5,5-trimethyl-1-hexanol, 3-heptanol, 1-octanol, 2-octanol, isoctylalcohol, 2-ethyl-1-hexanol, 1-decanol, 2-propyl-heptanol, 1-dodecanol, 1-tridecanol, 1-tetradecanol, and the like. In some embodiments, a preferred (meth)acrylate ester monomer is the ester of (meth)acrylic acid with isooctyl alcohol.

In some favored embodiments, the monomer is the ester of (meth)acrylic acid with an alcohol derived from a renewable source. A suitable technique for determining whether a material is derived from a renewable resource is through $^{14}$C analysis according to ASTM D6866-10, as described in US2012/0288692. The application of ASTM D6866-10 to derive a "bio-based content" is built on the same concepts as radiocarbon dating, but without use of the age equations. The analysis is performed by deriving a ratio of the amount of organic radiocarbon ($^{14}$C) in an unknown sample to that of a modern reference standard. The ratio is reported as a percentage with the units "pMC" (percent modern carbon).

One suitable monomer derived from a renewable source is 2-octyl (meth)acrylate, as can be prepared by conventional techniques from 2-octanol and (meth)acryloyl derivatives such as esters, acids and acyl halides. The 2-octanol may be prepared by treatment of ricinoleic acid, derived from castor oil, (or ester or acyl halide thereof) with sodium hydroxide, followed by distillation from the co-product sebacic acid. Other (meth)acrylate ester monomers that can be renewable are those derived from ethanol, 2-methyl butanol and dihydrocitronellol.

In some embodiments, the (meth)acrylic polymer and/or (e.g. pressure sensitive) adhesive composition comprises a bio-based content of at least 25, 30, 35, 40, 45, or 50 wt. % using ASTM D6866-10, method B. In other embodiments, the (e.g. pressure sensitive) adhesive composition comprises a bio-based content of at least 55, 60, 65, 70, 75, or 80 wt. %. In yet other embodiments, the composition comprises a bio-based content of at least 85, 90, 95, 96, 97, 99 or 99 wt. %.

The (meth)acrylic polymer and/or (e.g. pressure sensitive) adhesive composition comprises one or more low Tg monomers, having a Tg no greater than 10° C. when the monomer is polymerized (i.e. independently) to form a homopolymer. In some embodiments, the low Tg monomers have a Tg no greater than 0° C., no greater than −5° C., or no greater than −10° C. when reacted to form a homopolymer. The $T_g$ of these homopolymers is often greater than or equal to −80° C., greater than or equal to −70° C., greater than or equal to −60° C., or greater than or equal to −50° C. The Tg of these homopolymers can be, for example, in the range of −80° C. to 20° C., −70° C. to 10° C., −60° C. to 0° C., or −60° C. to −10° C.

The low Tg monomer may have the formula

wherein $R_1$ is H or methyl and $R^8$ is an alkyl with 1 to 22 carbons or a heteroalkyl with 2 to 20 carbons and 1 to 6 heteroatoms selected from oxygen or sulfur. The alkyl or heteroalkyl group can be linear, branched, cyclic, or a combination thereof.

Exemplary low Tg monomers include for example ethyl acrylate, n-propyl acrylate, n-butyl acrylate, isobutyl acrylate, t-butyl acrylate, n-pentyl acrylate, isoamyl acrylate, n-hexyl acrylate, 2-methylbutyl acrylate, 2-ethylhexyl acrylate, 4-methyl-2-pentyl acrylate, n-octyl acrylate, 2-octyl acrylate, isooctyl acrylate, isononyl acrylate, decyl acrylate, isodecyl acrylate, lauryl acrylate, isotridecyl acrylate, octadecyl acrylate, and dodecyl acrylate.

Low Tg heteroalkyl acrylate monomers include, for example, 2-methoxyethyl acrylate and 2-ethoxyethyl acrylate.

In some embodiments, the (meth)acrylic polymer and/or (e.g. pressure sensitive) adhesive composition comprises at least one low Tg monomer having a non-cyclic alkyl (meth) acrylate monomer(s) having 4 to 20 carbon atoms. In some embodiments, the (meth)acrylic polymer and/or (e.g. pressure sensitive) adhesive comprises at least one low Tg monomer having a (e.g. branched) alkyl group with 6 to 20 carbon atoms. In some embodiments, the low Tg monomer has a (e.g. branched) alkyl group with 7 or 8 carbon atoms. Exemplary monomers include, but are not limited to, 2-ethylhexyl methacrylate, isooctyl methacrylate, n-octyl methacrylate, 2-octyl methacrylate, isodecyl methacrylate, and lauryl methacrylate.

In some embodiments, the (meth)acrylic polymer and/or (e.g. pressure sensitive) adhesive composition comprises a high Tg monomer, having a Tg greater than 10° C. and typically of at least 15° C., 20° C. or 25° C., and preferably at least 50° C. Suitable high Tg monomers include, for example, t-butyl acrylate, methyl methacrylate, ethyl methacrylate, isopropyl methacrylate, n-butyl methacrylate, isobutyl methacrylate, s-butyl methacrylate, t-butyl methacrylate, stearyl methacrylate, phenyl methacrylate, cyclohexyl methacrylate, isobornyl acrylate, isobornyl methacrylate (110° C., according to Aldrich), norbornyl (meth) acrylate, benzyl methacrylate, 3,3,5 trimethylcyclohexyl acrylate, cyclohexyl acrylate, N-octyl acrylamide, and propyl methacrylate or combinations.

The (meth)acrylic polymer and/or (e.g. pressure sensitive) adhesive composition is a copolymer of at least one low Tg monomer, optionally other monomers, and at least one SSQ polymer, as described herein. The Tg of the copolymer may be estimated by use of the Fox equation, based on the Tgs of the constituent monomers and the weight percent thereof.

The alkyl (meth)acrylate monomers are typically present in the (meth)acrylic polymer in an amount of at least 50, 55, 60, 65, or 75 wt. % of the composition. When the composition is free of non-polymerized components such as tackifier, plasticizer, and/or filler; the concentrations described herein are also equivalent to the concentration of such polymerized units in the (meth)acrylic polymer.

In some embodiments, the (e.g. pressure sensitive) adhesive composition comprises at least 50, 55, 60, 65, 70, 75, 80, 85, 90 or 95 wt. % or greater of low Tg (e.g. alkyl) (meth)acrylate monomer(s). When high Tg monomers are included in a pressure sensitive adhesive, the adhesive may include at least 5, 10, 15, 20, to 30 parts by weight of such high Tg (e.g. alkyl) (meth)acrylate monomer(s).

The (meth)acrylic polymer may alternatively comprise less low Tg alkyl (meth)acrylate monomer(s). For example, the (meth)acrylic polymer may comprise at least 25, 30, 35, 40, or 45 wt. % of low Tg alkyl (meth)acrylate monomer in combination with high Tg alkyl (meth)acrylate monomer(s) such that the total alkyl(meth)acrylate monomer is at least 50, 55, 60, 65, or 75 wt. %.

The (meth)acrylic polymer and/or (e.g. pressure sensitive) adhesive composition may optionally comprise an acid functional monomer (a subset of high Tg monomers), where the acid functional group may be an acid per se, such as a carboxylic acid, or a portion may be salt thereof, such as an alkali metal carboxylate. Useful acid functional monomers include, but are not limited to, those selected from ethylenically unsaturated carboxylic acids, ethylenically unsaturated sulfonic acids, ethylenically unsaturated phosphonic acids, and mixtures thereof. Examples of such compounds include those selected from acrylic acid, methacrylic acid, itaconic acid, fumaric acid, crotonic acid, citraconic acid, maleic acid, oleic acid, β-carboxyethyl (meth)acrylate, 2-sulfoethyl methacrylate, styrene sulfonic acid, 2-acrylamido-2-methylpropanesulfonic acid, vinylphosphonic acid, and mixtures thereof.

Due to their availability, acid functional monomers are generally selected from ethylenically unsaturated carboxylic acids, i.e. (meth)acrylic acids. When even stronger acids are desired, acidic monomers include the ethylenically unsaturated sulfonic acids and ethylenically unsaturated phosphonic acids. The acid functional monomer is generally used in amounts of 0.5 to 15 parts by weight, preferably 0.5 to 10 parts by weight, based on 100 parts by weight total monomer.

The (meth)acrylic polymer and/or (e.g. pressure sensitive) adhesive composition may optionally comprise other monomers such as a non-acid-functional polar monomer.

Representative examples of suitable polar monomers include but are not limited to 2-hydroxyethyl (meth)acrylate; N-vinylpyrrolidone; N-vinylcaprolactam; acrylamide; mono- or di-N-alkyl substituted acrylamide; t-butyl acrylamide; dimethylaminoethyl acrylamide; N-octyl acrylamide; poly(alkoxyalkyl) (meth)acrylates including 2-(2-ethoxyethoxy)ethyl (meth)acrylate, 2-ethoxyethyl (meth)acrylate, 2-methoxyethoxyethyl (meth)acrylate, 2-methoxyethyl methacrylate, polyethylene glycol mono (meth)acrylates; alkyl vinyl ethers, including vinyl methyl ether; and mixtures thereof. Preferred polar monomers include those selected from the group consisting of 2-hydroxyethyl (meth)acrylate and N-vinylpyrrolidinone. The non-acid-functional polar monomer may be present in amounts of 0 to 10 parts by weight, or 0.5 to 5 parts by weight, based on 100 parts by weight total monomer.

When used, vinyl monomers useful in the (meth)acrylate polymer include vinyl esters (e.g., vinyl acetate and vinyl propionate), styrene, substituted styrene (e.g., α-methyl styrene), vinyl halide, and mixtures thereof. As used herein vinyl monomers are exclusive of acid functional monomers, acrylate ester monomers and polar monomers. Such vinyl monomers are generally used at 0 to 5 parts by weight, preferably 1 to 5 parts by weight, based on 100 parts by weight total monomer.

Due to the inclusion of a sufficient amount of low Tg (e.g. alkyl (meth)acrylate) monomer and/or other additives such as plasticizer and tackifier compositions described herein typically have a glass transition temperature "Tg" of no greater than 50° C. As used herein, Tg refers to the value obtained utilizing dynamic mechanical analysis. In some embodiments, the compositions have a Tg no greater than 45° C., 40° C., 35° C., 30° C., 25° C., or 20° C. In some embodiments, the compositions have a Tg no greater than 15° C., 10° C., 5° C., 0° C., or –0.5° C.

The (meth)acrylic polymer and/or (e.g. pressure sensitive) adhesive may optionally comprise at least one other crosslinker, in addition to the SSQ polymer crosslinker.

In some embodiments, the (e.g. pressure sensitive) adhesive comprises a multifunctional (meth)acrylate crosslinking monomer. Examples of useful multifunctional (meth)acrylate include, but are not limited to, di(meth)acrylates, tri (meth)acrylates, and tetra(meth)acrylates, such as 1,6-hexanediol di(meth)acrylate, poly(ethylene glycol) di(meth) acrylates, polybutadiene di(meth)acrylate, polyurethane di(meth)acrylates, and propoxylated glycerin tri(meth)acrylate, and mixtures thereof.

Generally the multifunctional (meth)acrylate is not part of the original monomer mixture, but added subsequently to the syrup after the formation of the (meth)acrylic polymer. When utilized, the multifunctional (meth)acrylate is typically used in an amount of at least 0.05, 0.10, 0.15, 0.20 up to 1, 2, 3, 4, or 5 parts by weight, relative to 100 parts by weight of the total monomer content.

In some embodiments, the (meth)acrylic polymer and/or (e.g. pressure sensitive) adhesive comprises predominantly (greater than 50%, 60%, 70%, 80%, or 90% of the total crosslinks) or exclusively crosslinks from the SSQ polymer crosslinker. In such embodiment, the composition may be free of other crosslinking monomers, particularly multi (meth)acrylate crosslinkers such as 1,6-hexane diol diacrylate (HDDA).

The (e.g. pressure sensitive) adhesive may optionally contain one or more conventional additives. Preferred additives include tackifiers, plasticizers, dyes, antioxidants, UV stabilizers, and (e.g. inorganic) fillers such as (e.g. fumed) silica and glass bubbles. In some embodiments no tackifier is used. When tackifiers are used, the concentration can range from 5 or 10, 15 or 20 wt. % or greater of the (e.g. cured) adhesive composition.

Various types of tackifiers include phenol modified terpenes and rosin esters such as glycerol esters of rosin and pentaerythritol esters of rosin that are available under the trade designations "Nuroz", "Nutac" (Newport Industries), "Permalyn", "Staybelite", "Foral" (Eastman). Also available are hydrocarbon resin tackifiers that typically come from C5 and C9 monomers by products of naphtha cracking and are available under the trade names "Piccotac", "Eastotac", "Regalrez", "Regalite" (Eastman), "Arkon" (Arakawa), "Norsolene", "Wingtack" (Cray Valley), "Nevtack", LX (Neville Chemical Co.), "Hikotac", "Hikorez" (Kolon Chemical), "Novares" (Rutgers Nev.), "Quintone" (Zeon), "Escorez" (Exxonmobile Chemical), "Nures", and "H-Rez" (Newport Industries). Of these, glycerol esters of rosin and pentaerythritol esters of rosin, such as available under the trade designations "Nuroz", "Nutac", and "Foral" are considered biobased materials.

The (meth)acrylic copolymers can be polymerized by various techniques including, but not limited to, solvent polymerization, dispersion polymerization, solventless bulk polymerization, and radiation polymerization, including processes using ultraviolet light, electron beam, and gamma radiation. The monomer mixture may comprise a polymerization initiator, especially a thermal initiator or a photoinitiator of a type and in an amount effective to polymerize the comonomers.

A typical solution polymerization method is carried out by adding the monomers, a suitable solvent, and an optional chain transfer agent to a reaction vessel, adding a free radical initiator, purging with nitrogen, and maintaining the reaction vessel at an elevated temperature (e.g. about 40 to 100° C.) until the reaction is complete, typically in about 1 to 20 hours, depending upon the batch size and temperature. Examples of typical solvents include methanol, tetrahydrofuran, ethanol, isopropanol, acetone, methyl ethyl ketone, methyl acetate, ethyl acetate, toluene, xylene, and an ethylene glycol alkyl ether. Those solvents can be used alone or as mixtures thereof.

Useful initiators include those that, on exposure to heat or light, generate free-radicals that initiate (co)polymerization of the monomer mixture. The initiators are typically employed at concentrations ranging from about 0.0001 to about 3.0 parts by weight, preferably from about 0.001 to about 1.0 parts by weight, and more preferably from about 0.005 to about 0.5 parts by weight of the total monomer or polymerized units.

Suitable initiators include but are not limited to those selected from the group consisting of azo compounds such as VAZO 64 (2,2'-azobis(isobutyronitrile)), VAZO 52 (2,2'-azobis(2,4-dimethylpentanenitrile)), and VAZO 67 (2,2'-azobis-(2-methylbutyronitrile)) available from E.I. du Pont de Nemours Co., peroxides such as benzoyl peroxide and lauroyl peroxide, and mixtures thereof. The preferred oil-soluble thermal initiator is (2,2'-azobis-(2-methylbutyronitrile)). When used, initiators may comprise from about 0.05 to about 1 part by weight, preferably about 0.1 to about 0.5 part by weight based on 100 parts by weight of monomer components in the (e.g. pressure sensitive) adhesive.

The polymers have pendent unsaturated groups that can be crosslinked by a variety of methods. These include addition of thermal or photoinitiators followed by heat or UV exposure after coating. The polymers may also be crosslinked by exposure to electron beam or gamma irradiation.

One method of preparing (meth)acrylic polymers includes partially polymerizing monomers to produce a syrup composition comprising the solute (meth)acrylic polymer and unpolymerized solvent monomer(s). The unpolymerized solvent monomer(s) typically comprises the same monomer as utilized to produce the solute (meth)acrylic polymer. If some of the monomers were consumed during the polymerization of the (meth)acrylic polymer, the unpolymerized solvent monomer(s) comprises at least some of the same monomer(s) as utilized to produce the solute (meth)acrylic polymer. Further, the same monomer(s) or other monomer(s) can be added to the syrup once the (meth)acrylic polymer has been formed. Partial polymerization provides a coatable solution of the (meth)acrylic solute polymer in one or more free-radically polymerizable solvent monomers. The partially polymerized composition is then coated on a suitable substrate and further polymerized.

In some embodiments, the cleavable crosslinking monomer is added to the monomer(s) utilized to form the (meth) acrylic polymer. Alternatively or in addition thereto, the cleavable crosslinking monomer may be added to the syrup after the (meth)acrylic polymer has been formed. The (meth) acrylate group of the crosslinker and other (e.g. (meth) acrylate) monomers utilized to form the (meth)acrylic polymer preferentially polymerize forming an acrylic backbone with the cleavable group.

The syrup method provides advantages over solvent or solution polymerization methods; the syrup method yielding higher molecular weight materials. These higher molecular weights increase the amount of chain entanglements, thus increasing cohesive strength. Also, the distance between cross-links can be greater with high molecular syrup polymer, which allows for increased wet-out onto a surface.

Polymerization of the (meth)acrylate solvent monomers can be accomplished by exposing the syrup composition to energy in the presence of a photoinitiator. Energy activated initiators may be unnecessary where, for example, ionizing radiation is used to initiate polymerization. Typically, a photoinitiator can be employed in a concentration of at least 0.0001 part by weight, preferably at least 0.001 part by weight, and more preferably at least 0.005 part by weight, relative to 100 parts by weight of the syrup.

A preferred method of preparation of the syrup composition is photoinitiated free radical polymerization. Advantages of the photopolymerization method are that 1) heating the monomer solution is unnecessary and 2) photoinitiation is stopped completely when the activating light source is turned off. Polymerization to achieve a coatable viscosity may be conducted such that the conversion of monomers to polymer is up to about 30%. Polymerization can be terminated when the desired conversion and viscosity have been achieved by removing the light source and by bubbling air (oxygen) into the solution to quench propagating free radicals. The solute polymer(s) may be prepared conventionally in a non-monomeric solvent and advanced to high conversion (degree of polymerization). When solvent (monomeric or non-monomeric) is used, the solvent may be removed (for example by vacuum distillation) either before or after formation of the syrup composition. While an acceptable method, this procedure involving a highly converted functional polymer is not preferred because an additional solvent removal step is required, another material may be required (a non-monomeric solvent), and dissolution of the high molecular weight, highly converted solute polymer in the monomer mixture may require a significant period of time.

The polymerization is preferably conducted in the absence of solvents such as ethyl acetate, toluene and tetrahydrofuran, which are non-reactive with the functional groups of the components of the syrup composition. Solvents influence the rate of incorporation of different monomers in the polymer chain and generally lead to lower molecular weights as the polymers gel or precipitate from solution. Thus, the (e.g. pressure sensitive) adhesive can be free of unpolymerizable organic solvent.

Useful photoinitiators include benzoin ethers such as benzoin methyl ether and benzoin isopropyl ether; substituted acetophenones such as 2,2-dimethoxy-2-phenylacetophenone photoinitiator, available the trade name IRGACURE 651 or ESACURE KB-1 photoinitiator (Sartomer Co., West Chester, Pa.), and dimethylhydroxyacetophenone; substituted α-ketols such as 2-methyl-2-hydroxy propiophenone; aromatic sulfonyl chlorides such as 2-naphthalenesulfonyl chloride; and photoactive oximes such as 1-phenyl-1,2-propanedione-2-(O-ethoxy-carbonyl)oxime.
Particularly preferred among these are the substituted acetophenones.

Preferred photoinitiators are photoactive compounds that undergo a Norrish I cleavage to generate free radicals that can initiate by addition to the acrylic double bonds. The photoinitiator can be added to the mixture to be coated after the polymer has been formed, i.e., photoinitiator can be added to the syrup composition. Such polymerizable photoinitiators are described, for example, in U.S. Pat. Nos. 5,902,836 and 5,506,279 (Gaddam et al.).

Such photoinitiators preferably are present in an amount of from 0.1 to 1.0 part by weight, relative to 100 parts by weight of the total syrup content. Accordingly, relatively thick coatings can be achieved when the extinction coefficient of the photoinitiator is low.

The syrup composition and the photoinitiator may be irradiated with activating UV radiation to polymerize the monomer component(s). UV light sources can be of two types: 1) relatively low light intensity sources such as blacklights, which provide generally 10 mW/cm$^2$ or less (as measured in accordance with procedures approved by the United States National Institute of Standards and Technology as, for example, with a UVIMAP UM 365 L-S radiometer manufactured by Electronic Instrumentation & Technology, Inc., in Sterling, Va.) over a wavelength range of 280 to 400 nanometers; and 2) relatively high light intensity sources such as medium pressure mercury lamps which provide intensities generally greater than 10 mW/cm$^2$, preferably 15 to 450 mW/cm$^2$. Where actinic radiation is used to fully or partially polymerize the syrup composition, high intensities and short exposure times are preferred. For example, an intensity of 600 mW/cm$^2$ and an exposure time of about 1 second may be used successfully. Intensities can range from 0.1 to 150 mW/cm$^2$, preferably from 0.5 to 100 mW/cm$^2$, and more preferably from 0.5 to 50 mW/cm$^2$.

The degree of conversion can be monitored during the irradiation by measuring the index of refraction of the polymerizing medium as previously described. Useful coating viscosities are achieved with conversions (i.e., the percentage of available monomer polymerized) in the range of up to 30%, preferably 2% to 20%, more preferably from 5% to 15%, and most preferably from 7% to 12%. The molecular weight (weight average) of the solute polymer(s) is at least 100,000 g/mole, 500,000 g/mole, or greater.

When preparing (meth)acrylic polymers described herein, it is expedient for the photoinitiated polymerization reactions to proceed to virtual completion, i.e., depletion of the monomeric components, at temperatures less than 70° C. (preferably at 50° C. or less) with reaction times less than 24 hours, preferably less than 12 hours, and more preferably less than 6 hours. These temperature ranges and reaction rates obviate the need for free radical polymerization inhibitors, which are often added to acrylic systems to stabilize against undesired, premature polymerization and gelation. Furthermore, the addition of inhibitors adds extraneous material that will remain with the system and inhibit the desired polymerization of the syrup composition and formation of the crosslinked (e.g. pressure sensitive) adhesives. Free radical polymerization inhibitors are often required at processing temperatures of 70° C. and higher for reaction periods of more than 6 to 10 hours.

In some embodiments, the (e.g. pressure sensitive) adhesive comprises fumed silica. Fumed silica, also known as pyrogenic silica, is made from flame pyrolysis of silicon tetrachloride or from quartz sand vaporized in a 3000° C. electric arc. Fumed silica consists of microscopic droplets of amorphous silica fused into (e.g. branched) three-dimensional primary particles that aggregate into larger particles. Since the aggregates do not typically break down, the average particle size of fumed silica is the average particle size of the aggregates. Fumed silica is commercially available from various global producers including Evonik, under the trade designation "Aerosil"; Cabot under the trade designation "Cab-O-Sil", and Wacker Chemie-Dow Corning. The BET surface area of suitable fumed silica is typically at least 50 m$^2$/g, or 75 m$^2$/g, or 100 m$^2$/g. In some embodiments, the BET surface area of the fumed silica is no greater than 400 m$^2$/g, or 350 m$^2$/g, or 300 m$^2$/g, or 275 m$^2$/g, or 250 m$^2$/g. The fumed silica aggregates preferably comprise silica having a primary particle size no greater than 20 nm or 15 nm. The aggregate particle size is substantially larger than the primary particle size and is typically at least 100 nm or greater.

The concentration of (e.g. fumed) silica can vary. In some embodiments, the (e.g. pressure sensitive) adhesive comprises at least 0.5, 1.0, 1.1, 1.2, 1.3, 1.4, or 1.5 wt-% of (e.g. fumed) silica and in some embodiments no greater than 5, 4, 3, or 2 wt-%. In other embodiments, the adhesive comprises at least 5, 6, 7, 8, 9, or 10 wt-% of (e.g. fumed) silica and typically no greater than 20, 19, 18, 17, 16, or 15 wt-% of (e.g. fumed) silica.

In some embodiments, the (e.g. pressure sensitive) adhesive comprises glass bubbles. Suitable glass bubbles generally have a density ranging from about 0.125 to about 0.35 g/cc. In some embodiments, the glass bubbles have a density less than 0.30, 0.25, or 0.20 g/cc. Glass bubbles generally have a distribution of particles sizes. In typical embodiments, 90% of the glass bubbles have a particle size (by volume) of at least 75 microns and no greater than 115 microns. In some embodiments, 90% of the glass bubbles have a particle size (by volume) of at least 80, 85, 90, or 95 microns. In some embodiments, the glass bubbles have a crush strength of at least 250 psi and no greater than 1000, 750, or 500 psi. Glass bubbles are commercially available from various sources including 3M, St. Paul, Minn.

The concentration of glass bubbles can vary. In some embodiments, the adhesive comprises at least 1, 2, 3, 4 or 5 wt-% of glass bubbles and typically no greater than 20, 15, or 10 wt-% of glass bubbles.

The inclusion of glass bubbles can reduce the density of the adhesive. Another way of reducing the density of the adhesive is by incorporation of air or other gasses into the adhesive composition. For example the (e.g. syrup) adhesive composition can be transferred to a frother as described for examples in U.S. Pat. No. 4,415,615; incorporated herein by reference. While feeding nitrogen gas into the frother, the frothed syrup can be delivered to the nip of a roll coater between a pair of transparent, (e.g. biaxially-oriented polyethylene terephthalate) films. A silicone or fluorochemical surfactant is included in the froathed syrup. Various surfactants are known including copolymer surfactants described in U.S. Pat. No. 6,852,781.

In some embodiments no tackifier is used. When tackifiers are used, the concentration can range from 5 or 10 wt-% to 40, 45, 50, 55, or 60 wt-% of the (e.g. cured) adhesive composition.

Various types of tackifiers include phenol modified terpenes and rosin esters such as glycerol esters of rosin and pentaerythritol esters of rosin that are available under the trade designations "Nuroz", "Nutac" (Newport Industries), "Permalyn", "Staybelite", "Foral" (Eastman). Also available are hydrocarbon resin tackifiers that typically come from C5 and C9 monomers by products of naphtha cracking and are available under the trade names "Piccotac", "Eastotac", "Regalrez", "Regalite" (Eastman), "Arkon" (Arakawa), "Norsolene", "Wingtack" (Cray Valley), "Nevtack", LX (Neville Chemical Co.), "Hikotac", "Hikorez" (Kolon Chemical), "Novares" (Rutgers Nev.), "Quintone" (Zeon), "Escorez" (Exxonmobile Chemical), "Nures", and "H-Rez" (Newport Industries). Of these, glycerol esters of rosin and pentaerythritol esters of rosin, such as available under the trade designations "Nuroz", "Nutac", and "Foral" are considered biobased materials.

Depending on the kinds and amount of components, the (e.g. pressure sensitive) adhesive can be formulated to have a wide variety of properties for various end uses. In some embodiments, the adhesive is cleanly removable from stainless steel and the 180° peel adhesion (according to Test Method 1 described in the forthcoming examples) is at least 25, 50, or 100 N/dm and can range up to 200 N/dm or greater. In some embodiments, the shear holding power is greater than 10,000 minutes (according to Test Method 3 described in the forthcoming examples)

The adhesives may be coated upon a variety of flexible and inflexible backing materials using conventional coating techniques to produce adhesive-coated materials. Flexible substrates are defined herein as any material which is conventionally utilized as a tape backing or may be of any other flexible material. Examples include, but are not limited to plastic films such as polypropylene, polyethylene, polyvinyl chloride, polyester (polyethylene terephthalate), polycarbonate, polymethyl(meth)acrylate (PMMA), cellulose acetate, cellulose triacetate, and ethyl cellulose. In some embodiments, the backing is comprised of a bio-based material such as polylactic acid (PLA). Foam backings may be used. Foams are commercially available from various suppliers such as 3M Co., Voltek, Sekisui, and others. The foam may be formed as a coextruded sheet with the adhesive on one or both sides of the foam, or the adhesive may be laminated to it. When the adhesive is laminated to a foam, it may be desirable to treat the surface to improve the adhesion of the adhesive to the foam or to any of the other types of backings. Such treatments are typically selected based on the nature of the materials of the adhesive and of the foam or backing and include primers and surface modifications (e.g., corona treatment, surface abrasion).

Backings may also be prepared of fabric such as woven fabric formed of threads of synthetic or natural materials such as cotton, nylon, rayon, glass, ceramic materials, and the like or nonwoven fabric such as air laid webs of natural or synthetic fibers or blends of these. The backing may also be formed of metal, metalized polymer films, or ceramic sheet materials may take the form of any article conventionally known to be utilized with (e.g. pressure sensitive) adhesive compositions such as labels, tapes, signs, covers, marking indicia, and the like.

In some embodiments, the backing material is a transparent film having a transmission of visible light of at least 90 percent. The transparent film may further comprise a graphic. In this embodiment, the adhesive may also be transparent.

The above-described compositions can be coated on a substrate using conventional coating techniques modified as appropriate to the particular substrate. For example, these compositions can be applied to a variety of solid substrates by methods such as roller coating, flow coating, dip coating, spin coating, spray coating knife coating, and die coating. These various methods of coating allow the compositions to be placed on the substrate at variable thicknesses thus allowing a wider range of use of the compositions. Coating thicknesses may vary as previously described. The syrup composition may be of any desirable concentration for subsequent coating, but is typically 5 to 20 wt-% polymer solids in monomer. The desired concentration may be achieved by further dilution of the coating composition, or by partial drying. Coating thicknesses may vary from about 25 to 1500 microns (dry thickness). In typical embodiments, the coating thickness ranges from about 50 to 250 microns.

The adhesive can also be provided in the form of a (e.g. pressure sensitive) adhesive transfer tape in which at least one layer of the adhesive is disposed on a release liner for application to a permanent substrate at a later time. The adhesive can also be provided as a single coated or double coated tape in which the adhesive is disposed on a permanent backing.

For a single-sided tape, the side of the backing surface opposite that where the adhesive is disposed is typically coated with a suitable release material. Release materials are known and include materials such as, for example, silicone, polyethylene, polycarbamate, polyacrylics, and the like. For double coated tapes, another layer of adhesive is disposed on the backing surface opposite that where the adhesive of the invention is disposed. The other layer of adhesive can be different from the adhesive of the invention, e.g., a conventional acrylic PSA, or it can be the same adhesive as the invention, with the same or a different formulation. Double coated tapes are typically carried on a release liner. Additional tape constructions include those described in U.S. Pat. No. 5,602,221 (Bennett et al.), incorporated herein by reference.

Objects and advantages of this invention are further illustrated by the following examples, but the particular materials and amounts thereof recited in these examples, as well as other conditions and details, should not be construed to unduly limit this invention. These examples are merely for illustrative purposes only and are not meant to be limiting on the scope of the appended claims.

TABLE 1

MATERIALS

| Designation | Description and Supplier |
|---|---|
| Vinyltriethoxysilane | Vinyltriethoxysilane, available from Gelest, Inc., Morrisville, PA |
| Phenyltrimethoxysilane | Phenyltrimethoxysilane, available from Gelest, Inc., Morrisville, PA |
| EthylTEOS | Ethyltriemoxysilane, available from Gelest, Inc., Morrisville, PA |
| tartaric acid | tartaric acid, available from Sigma-Aldrich Co., Milwaukee, WI |
| CAP-1 | Hexamethyldisiloxane |
| CAP-2 Ethoxytrimethylsilane | Ethoxytrimethylsilane, available from Gelest, Inc., Morrisville, PA |
| AA | Acrylic acid, available from BASF Corporation, Florham Park, NJ |
| AEROSIL R972 | Fumed silica, available from Evonik, Essen, Germany, under the trade designation "AEROSIL R972" |
| EthylTEOS | Ethyltriethoxysilane, available from Gelest, Inc., Morrisville, PA |
| FORAL 85 | An ester of hydrogenated rosin derived from glycerol and a stabilized rosin, available from Eastman Chemical Co., Kingsport, TN under the trade designation "FORAL 85" |
| HDDA | 1,6-hexanediol diacrylate, available from Sigma-Aldrich Co., Milwaukee, WI |
| IOA | Isooctyl acrylate, available under the trade designation "SR 440" from Sartomer, USA, LLC. |
| IRG651 | 2,2-Dimethoxy-1,2-diphenylethan-1-one, an initiator available from BASF Corporation, Florham Park, NJ, under the trade designation "IRGACURE 651" |
| IRQ184 | An initiator available from BASF Corporation, Florham Park, NJ, under the trade designation "IRGACURE 184" |
| 2OA | 2-Octyl acrylate, prepared according to Preparatory Example 1 of U.S. Pat. No. 7,385,020. |
| REGALREZ 6108 | Hydrocarbon resin, used as a tackifier, available from Eastman Chemical Company, Kinsport, TN, under the trade designation "REGALREZ 6108" |
| T-50 | silicone release liner, available from CPFilms, Martinville, VA, under the trade designation "T-50" |
| T-10 | silicone release liner, available from CPFilms, Martinville, VA, under the trade designation "T-10" |

Test Method 1: 180° Peel Adhesion

A 180° Peel adhesion test was conducted to estimate the force necessary to peel an adhesive tape from a substrate, which is indicative of its peel strength. Peel adhesion strength was measured at a 180° angle using an IMASS SP-200 slip/peel tester (available from IMASS, Inc., Accord MA) at a peel rate of 305 mm/minute (12 inches/minute). Sample tapes were laminated and attached on a stainless steel ("SS") substrate panel. Test panels were prepared by wiping the substrate panels with a tissue wetted with 2-propanol, using heavy hand pressure to wipe the panel 8 to 10 times. This wiping procedure was repeated two more times with clean tissues wetted with solvent. The cleaned panel was allowed to air dry for 30 mins. The adhesive tape was cut into strips measuring ~1.3 cm by 20 cm (½ in. by 8 in.), and the strips were rolled down onto the cleaned panel with a 2.0 kg (4.5 lb.) rubber roller using 2 passes. The prepared samples were stored at 23° C./50% relative humidity (RH) for different periods of aging times, typically 1 h, before testing. Peel strength values were the average result of 3-5 repeated experiments. The adhesive was cleanly removable from the stainless steel unless indicated otherwise.

Test Method 2: 90° Peel Adhesion

Two 1.0 inch (2.54 cm) by 3.0 inch (7.62 cm) strips of adhesive were laminated to a 5 mil (127 micrometers) aluminum foil backing for testing and were adhered to a stainless steel ("SS") substrate by rolling twice in each direction with a 6.8 kg roller onto the tape at 12 inches per minute (about 305 mm/min). The force required to peel the tape at 90° was measured after a 24 hour dwell at 25° C./50% RH on an INSTRON device (MODEL NUMBER 4465). The measurements for the two tape samples were in pound-force per inch with a platen speed of 12 inches per minute (about 305 mm/min) then averaged for recorded values.

Test Method 3: Shear Holding Power, Version 1

Shear holding power (or static shear strength) was evaluated at 23° C./50% RH using a 1 kg load. Tape test samples measuring 0.5 inch (1.27 cm) by 6 inches (15.24 cm) were adhered to 1.5 inch (3.8 cm) by 2 inch (5.1 cm) stainless steel ("SS") panels using the method to clean the panel and attach the tape described in the peel adhesion test. The tape overlapped the panel by 1.27 cm by 2.54 cm (½ inch by 1 inch), and the strip was folded over itself on the adhesive side, and then folded again. A hook was hung in the second fold and secured by stapling the tape above the hook. The weight was attached to the hook and the panels were hung in a 23° C./50% RH room. The time to failure in minutes was recorded. If no failure was observed after 10,000 minutes (167 hours, ca. 1 week), the test was stopped and a value of 10,000+ minutes was recorded. When the shear holding power was less than 10,000 minutes, the sample failed cohesively unless indicated otherwise.

Test Method 4: Shear Holding Power, Version 2

Stainless steel ("SS") plates were prepared for testing by cleaning with methyl ethyl ketone and a clean tissue three times. The adhesive films described were cut into strips (1.27 cm in width) and adhered by their adhesive to flat, rigid stainless steel plates with 2.54 cm length of each adhesive film strip in contact with the plate to which it was adhered. A weight of 2 kilograms (4.5 pounds) was rolled over the adhered portion. Each of the resulting plates with the adhered film strip was equilibrated at room temperature for 15 minutes. Afterwards, the samples were hung at room temperature (RT, ~25° C.) and a 1 kg weight was hung from the free end of the adhered film strip with the panel tilted 2° from the vertical to insure against any peeling forces. The time (in minutes) at which the weight fell, as a result of the adhesive film strip releasing from the plate, was recorded. The test was discontinued at 10,000 minutes if there was no failure (recorded as 10,000+ minutes). Two specimens of each tape (adhesive film strip) were tested and the shear strength tests were averaged to obtain the reported shear values.

Test Method 5: Shear Holding Power, Version 3

The procedure followed generally the methods described in ASTM D-3654/D 3654M 06, PSTC-107-FOR SS 15. A stainless steel backing was adhered to a stainless steel substrate and cut down to leave a 1.0 inch (2.54 cm) by 0.5 inch (1.27 cm) square for 158° F. (70° C.) temperature shear testing. A weight of was 1 kg was placed on the sample for 15 minutes. A 500 g load was attached to the tape sample for testing. Each sample was suspended until failure and/or test terminated. The time to failure, as well as the mode of failure, was recorded. Samples were run in triplicate and averaged for reported values.

PREPARATORY EXAMPLE P1 (PE-1)

Trimethyl silyl polyvinylsilsesquioxane ("PVSSQ")

VinylTEOS (100 g), deionized (DI) water (50 g), and oxalic acid (0.5 g) were mixed together at room temperature in a 500 mL round bottom flask equipped with a condenser. Ethoxytrimethylsilane (20 g) was then added, and the resulting mixture was stirred at room temperature for 6-8 hours followed by the evaporation of the solvents (water/ethanol mixture). The resulting liquid was dissolved in methyl ethyl ketone ("MEK", 100 mL) and washed three-times with DI water (100 mL). After washing, the MEK was evaporated under reduced pressure to yield polymer product polyvinylsilsesquioxane as a viscous liquid.

PREPARATORY EXAMPLE 2 (PE-2)

Trimethyl silyl polyvinyl-co-ethyl silsesquioxane

Vinyltriethoxysilane (100 g), ethyltriethoxysilane (100), distilled water (100 g), and tartaric acid (0.5 g) were mixed together at room temperature in a 500 mL round bottom flask equipped with a condenser. Ethoxytrimethylsilane (20 g) was then added, and the resulting mixture was stirred at room temperature for 6-8 hours followed by the evaporation of solvents at 50° C. under reduced pressure. The resulting viscous liquid was dissolved in a mixture of IPA:MEK (70:30 weight ratio, 100 mL) and washed three-times with deionized water (100 mL). After washing, the MEK was evaporated under reduced pressure to yield polyvinyl-co-ethyl silsesquioxane as a tacky, viscous liquid.

COMPARATIVE PREPARATORY EXAMPLE 3 (PE-3)

Trimethyl silyl poly(ethylsilsesquioxane)

Ethyltriethoxysilane (100), distilled water (50 g), and tartaric acid (0.25 g) were mixed together at room temperature in a 500 mL round bottom flask equipped with a condenser. Ethoxytrimethylsilane (20 g) was then added, and the resulting mixture. The mixture was stirred at room temperature for 6 to 8 hours followed by the evaporation of solvents under reduced pressure. The resulting viscous liquid was dissolved in a mixture of IPA:MEK (70:30 weight ratio, 100 mL) and washed three-times with deionized water (100 mL). After washing, the MEK was evaporated at 50° C. under reduced pressure to yield poly(ethylsilsesquioxane) as a tacky, viscous liquid.

PREPARATORY EXAMPLE 4 (PE-4)

Trimethyl silyl end-capped vinyl-co-phenyl silsesquioxane

For EX4, vinyltriethoxysilane (100 g; 0.52 moles), phenytrimethoxysilane (100 g; 0.56 moles), distilled water (50 g), and tartaric acid (1.0 g) were mixed together at room temperature in a 500 mL round bottom flask equipped with a condenser. The mixture was stirred at room temperature, after 20 minutes of stirring an exotherm was observed; thereafter the temperature was maintained at 70° C. for 3-4 hrs. CAP-1 (50 g) or CAP-2 (80 g) was added to the reaction mixture followed by the stirring at 70° C. for 3 hrs to convert the silanol groups to trialkylsilyl (i.e. trimethylsilyl) groups. Evaporation of the solvents (water/ethanol mixture) yielded vinylsilsesquioxane as viscous liquid, which was dissolved in heptanes (200 mL). The heptanes solution was passed through 1-micron filter paper leading to the separation of insoluble tartaric acid. The evaporation of heptanes at 100° C. and under reduced pressure yielded a gummy liquid.

PREPARATORY EXAMPLE 5 (PE-5)

Methyl Core/Vinyl Outer Layer SSQ Polymer

Methyltriethoxysilane (100 g/0.56 moles), deionized water (70 g), and tartaric acid (0.25 g) were mixed together at room temperature in a 500 mL round bottom flask equipped with a condenser. The mixture was stirred at 70° C. for 1 hour, followed by the addition of vinyltriethoxysilane (10 g/0.052 moles) and subsequently stirring for 1 hour. Ethoxytrimethylsilane (20 g/0.17 moles) end-capping agent was then added, and the resulting mixture was stirred at 70° C. for 1 hour, followed by evaporation of the solvents (a water/ethanol mixture) under reduced pressure. The resulting viscous liquid was then dissolved in MEK (100 mL) and washed three-times with deionized water (100 mL). The MEK was then evaporated under reduced pressure to yield the SSQ core/outer layer polymer as a viscous liquid and depicted in FIG. 1.

PREPARATORY EXAMPLE 6 (PE-6)

Vinyl Core/Methyl Outer Layer SSQ Polymer

Vinyltriethoxysilane (100 g/0.52 moles), deionized water (70 g), and tartaric acid (0.25 g) were mixed together at room temperature in a 500 mL round bottom flask equipped with a condenser. The mixture was stirred at 70° C. for 1 hour, followed by the addition of methyltriethoxysilane (100 g/0.56 moles) and subsequently stirring for 1 hour. Ethoxytrimethylsilane (20 g) end-capping agent was then added, and the resulting mixture was stirred at 70° C. for 1 hour, followed by evaporation of the solvents (a water/ethanol mixture) under reduced pressure. The resulting viscous liquid was then dissolved in MEK (100 mL) and washed three-times with deionized water (100 mL). The MEK was then evaporated under reduced pressure to yield the SSQ core/outer layer polymer as a viscous liquid.

EXAMPLE 1A (EX-1A)

Making of tapes containing PVSSQ

A glass jar was charged with 19 grams IOA, 1 gram AA and 0.008 grams of IRG651 . The monomer mixture was stirred for 30 minutes at 21° C., purged with nitrogen for 5 minutes, and then exposed to low intensity UV-A ultraviolet light (less than 10 mW/cm$^2$, referred to as UV-A because the output is primarily between 320 and 390 nm with a peak emission at around 350 nm which is in the UV A spectral region) until a coatable, pre-adhesive polymeric syrup was formed. PVSSQ (0.02 gram) from Preparative Example 1 and an additional 0.032 grams IRG651 were added into the polymeric syrup and the jar was rotated over rubber rollers for 12 hours. The polymeric syrup was then coated between silicone release liners T-10 and T-50 at an approximate thickness of 4.4 mils (112 micrometers) and cured by means of UV-A light at a dosage of 750 mJ/cm$^2$. The release liner T-10 was then removed and the adhesive was laminated onto a 2 mils (51 micrometers) thick PET (Mitsubishi 3 SAB) liner.

EXAMPLE 1B (EX-1B) AND EXAMPLE 1C (EX-1C)

The tapes of Examples 1B and 1C were prepared according to the process for Example 1A, except that the amounts of PVSSQ added into the polymeric syrup were 0.04 gram and 0.06 gram, respectively.

COMPARATIVE EXAMPLE 1 (CE-1)

A tape of Comparative Example 1 was prepared in the manner identical to Example 1A, except that HDDA (0.02 gram) was added to the polymeric syrup, instead of the PVSSQ.

EXAMPLES 2A (EX-2A) AND 2B (EX-2B)

Making of PSA containing PVSSQ and HDDA

A tape of Example 2A was prepared in the manner identical to Example 1A, except that 0.02 grams of HDDA and 0.02 grams of PVSSQ were added into the polymeric syrup, instead of only 0.02 grams of the PVSSQ.

A tape of Example 2B was prepared in the manner identical to Example 1A, except that 0.01 grams of HDDA and 0.01 grams of PVSSQ were added into the polymeric syrup, instead of only 0.02 grams of the PVSSQ.

COMPARATIVE EXAMPLE 1 (CE-1)

A tape of Comparative Example 1 was prepared in the manner identical to Example 1A, except that no crosslinker was added to the polymeric syrup.

TABLE 2

| Example | IOA parts | AA parts | IRG651 parts | HDDA parts | SSQ Polymer Crosslinker parts |
|---|---|---|---|---|---|
| Comparative CE-1 | 95 | 5 | 0.2 | 0.10 | 0 |
| EX-1A | 95 | 5 | 0.2 | 0 | 0.10 PVSSQ |
| EX-1B | 95 | 5 | 0.2 | 0 | 0.20 PVSSQ |
| EX-1C | 95 | 5 | 0.2 | 0 | 0.30 PVSSQ |
| EX-2A | 95 | 5 | 0.2 | 0.10 | 0.10 PVSSQ |
| EX-2B | 95 | 5 | 0.2 | 0.05 | 0.05 PVSSQ |
| Comparative CE-2 | 95 | 5 | 0.2 | 0 | No Crosslinker |

The tapes prepared in Examples 1A-2D were evaluated for adhesive properties, with results as summarized in Table 3.

TABLE 3

| Example | Adhesion to Stainless Steel, 180° Peel Adhesion, Test Method 1, oz/in (N/dm) | Shear Holding Power, Test Method 3, minutes |
|---|---|---|
| Comparative CE-1 | 45 (49) | 10000+ |
| EX-1A | 62 (68) | 153 |
| EX-1B | 55 (60) | 415 |
| EX-1C | 50 (55) | 10000+ |
| EX-2A | 42 (46) | 10000+ |
| EX-2B | 54 (59) | 10000+ |
| Comparative CE-2 | | |

*residue

EXAMPLE 4A

Tackified formulation

A glass jar was charged with 374 grams IOA, 26 gram AA and 0.16 grams of IRG651. The monomer mixture was stirred and exposed to low intensity ultraviolet lighting the same manner as EX-1A until a coatable pre-adhesive polymeric syrup was formed. This forms a master batch, from which 15 g of the syrup was transferred to a smaller glass jar. In that smaller glass jar, the following were further added: 1.7 g of FORAL 85, 0.03 g of IRG651, and 0.05 g of PVSSQ. The jar was rotated over rubber rollers for 12 hours. The polymeric syrup was then coated between silicone release liners T-10 and T-50 at an approximate thickness of 3 mils (76 micrometers) and cured by means of UV-A light at a dosage of 750 mJ/cm$^2$. The release liner T-10 was then removed and the adhesive was laminated onto a 2 mils (51 micrometers) thick PET (Mitsubishi 3SAB) liner.

Examples 4B, 4C, 4D, and 4E were prepared according to the process for Example 4A, except using the amounts of PVSSQ, as summarized in Table 4.

TABLE 4

| Example | IOA Parts by wt. (% by wt) | AA Parts by wt. (% by wt) | FORAL 85 Parts by wt. (% by wt) | IRG651 Parts by wt. (% by wt) | PVSSQ Parts by wt. (% by wt) |
|---|---|---|---|---|---|
| EX-4A | 93.5 (84.6) | 6.5 (5.88) | 10 (9.05) | 0.2 (0.18) | 0.30 (0.27) |
| EX-4B | 93.5 (84.54) | 6.5 (5.88) | 10 (9.04) | 0.2 (0.18) | 0.40 (0.36) |
| EX-4C | 93.5 (84.46) | 6.5 (5.88) | 10 (9.03) | 0.2 (0.18) | 0.50 (0.45) |
| EX-4D | 93.5 (84.39) | 6.5 (5.87) | 10 (9.03) | 0.2 (0.18) | 0.60 (0.54) |
| EX-4E | 93.5 (84.31) | 6.5 (5.86) | 10 (9.02) | 0.2 (0.18) | 0.70 (0.63) |
| Comparative EX-4F | 93.5 (84.85) | 6.5 (5.90) | 10 (9.07) | 0.2 (0.18) | No crosslinker |

EXAMPLE 5A

Different types of SSQs

A glass jar was charged with 374 grams IOA, 26 gram AA and 0.16 grams of IRG651. The monomer mixture was stirred and then exposed to low intensity ultraviolet light in the same manner as EX-1A until a coatable pre-adhesive polymeric syrup was formed. This forms a master batch, from which 15 g of the syrup was transferred to a smaller glass jar. In that smaller glass jar, the following were further added—0.024 g of IRG651, and 0.06 g of poly(ethylSSQ) of PE-3. The jar was rotated over rubber rollers for 12 hours. The polymeric syrup was then coated between silicone release liners T-10 and T-50 at an approximate thickness of 3 mils (76.2 micrometers) and cured by means of UV-A light at 750 mJ/cm$^2$. The release liner T-10 was then removed and the adhesive was laminated onto a 2 mils (51 micrometers) thick PET (Mitsubishi 3SAB) liner.

Examples 5B, 5C, and 5D were prepared according to the procedure for Example 5A except that other silsesquioxane polymer crosslinkers were used, as summarized in Table 5.

TABLE 5

| Example | IOA Parts by wt. | AA Parts by wt. | IRG651 Parts by wt. | Comparative PE-3 Parts by wt. | PVSSQ Parts by wt. | PE-2 Parts by wt. | PE-4 Parts by wt. |
|---|---|---|---|---|---|---|---|
| Comparative EX-5A | 93.5 | 6.5 | 0.2 | 0.4 | — | — | — |
| EX-5B | 93.5 | 6.5 | 0.2 | — | 0.4 | — | — |
| EX-5C | 93.5 | 6.5 | 0.2 | — | — | 0.4 | — |
| EX-5D | 93.5 | 6.5 | 0.2 | — | — | — | 0.4 |

The tapes prepared in the above Examples 4A-4E and 5A-5D were characterized for adhesive properties, with results as summarized in Table 6.

TABLE 6

| | Adhesion to Stainless Steel, 180° Peel Adhesion, Test Method 1, oz/in (N/dm) | Shear Holding Power, Test Method 3, minutes |
|---|---|---|
| EX-4A | 95* (104) | 47 |
| EX-4B | 77* (84) | 219 |
| EX-4C | 63 (69) | 527 |
| EX-4D | 60 (66) | 838 |
| EX-4E | 51 (56) | 2,118 |
| Comparative EX-4F | 22 (25)** | <1 |
| Comparative EX-5A | 59 (65) | 378 |
| EX-5B | 50 (55) | 10,000+ |
| EX-5C | 50 (55) | 567 |
| EX-5D | 54 (59) | 1575 |

*slight residue
**cohesive failure

EXAMPLE 6A

Variation of IOA/PVSSQ ratio

A glass jar was charged with 200 g IOA and 0.08 g of IRG651. The monomer mixture was stirred and then exposed to low intensity ultraviolet light in the same manner as EX-1A until a coatable pre-adhesive polymeric syrup was formed. This forms a master batch, from which quantitative and smaller amount of the syrup was transferred to a smaller glass jar. In that smaller glass jar, PVSSQ (prepared according to PE-1 above) and IRG651 were added, according to the relative amounts listed in Table 7. The jar was rotated over rubber rollers for 12 hours. The polymeric syrup was then coated between silicone release liners T-10 and T-50 at an approximate thickness of 3 mils (76 micrometers) and cured by means of UV-A light at 750 mJ/cm$^2$. The release liner T-10 was then removed and the adhesive was laminated onto a 2 mils (51 micrometers) thick PET (Mitsubishi 3 SAB) liner.

TABLE 7

| Example | IOA Parts by wt. | PVSSQ Parts by wt. | IRG651 Parts by wt. |
|---|---|---|---|
| EX-6A | 1 | 99 | 0.2 |
| EX-6B | 30 | 70 | 0.2 |
| EX-6C | 50 | 50 | 0.2 |
| EX-6D | 70 | 30 | 0.2 |
| EX-6E | 90 | 10 | 0.2 |

Examples 6B to 6E were prepared according to the procedure for Example 6A, except that the relative amounts of IOA and PVSSQ were as summarized in Table 7.

None of Examples 6A to 6E were sticky to touch, and each of Examples 6A to 6E was a smooth, transparent film.

EXAMPLES 7A AND 7B (EX-7A AND EX-7B)

Adhesive compositions EX-7A and EX-7B were prepared by charging an 8 ounce (~237 ml) jar with 45 g of 2O A, 5 g of AA, and 0.02 g of IRG651. The monomer mixture was purged with nitrogen for 2 minutes then exposed to UV A light from a low intensity black bulb (15 watt, 365 nm peak) until the viscosity increased and a coatable syrup was prepared.

An additional 0.08 g (0.16 phr) of the IRG651 and the amount of PVSSQ (see PE-1, above) shown in Table 8 were mixed into the syrup. Each composition was mixed thoroughly until a homogeneous syrup was obtained and then knife-coated between clear release liners at a 5 mil (127 micrometers) thickness and cured by exposure to UV A light from 350 BL light bulbs (40 watt, Osram Sylvania) as shown in Table 8 over 10 minutes. Total UV exposure was measured with an UVIRAD LOW ENERGY UV INTEGRATING RADIOMETER (available from EIT, Inc., Sterling, Va.). Tapes were laminated to PET for adhesive testing with results as summarized in Table 8.

TABLE 8

| Sample | Crosslinker Material | phr | grams | Total UV Exposure mJ/cm$^2$ | Shear Holding Power, Test Method 4 (min) | 180° Peel Adhesion to Stainless Steel, Test Method 1, (oz/in, N/dm) |
|---|---|---|---|---|---|---|
| EX-7A | PVSSQ | 1.00 | 0.50 | 3200 | 10,000+ | 67.8, 74.2 |
| EX-7B | PVSSQ | 1.67 | 0.83 | 3200 | 10,000+ | 48.4, 53.0 |

EXAMPLE 8 (EX-8)

Adhesive composition EX-8 was prepared by charging an 8 ounce (~237 ml) jar with 46.25 g of IOA, 3.25 g of AA, and 0.02 g of IRG184. The monomer mixture was purged with nitrogen for 2 minutes then exposed to UV A light from a low intensity black bulb (15 watt, 365 nm peak) until the viscosity increased and a coatable syrup was prepared.

An additional 0.08 g (0.16 phr) of the IRG184, the amount of PVSSQ shown in Table 9, and a 5 g portion of REGALREZ 6108 tackifier was mixed into the syrup. The composition was mixed thoroughly until a homogeneous syrup was obtained and then knife-coated between clear release liners at a 5 mil (127 micrometers) thickness and cured by exposure to UV A light from 350 BL light bulbs (40 watt, Osram Sylvania) as shown in Table 9 over 10 minutes. Total UV exposure was measured with an UVIRAD LOW ENERGY UV INTEGRATING RADIOMETER (obtained from EIT, Inc., Sterling, Va.). Tapes were laminated to PET for adhesive testing with results as summarized in Table 9.

TABLE 9

| Sample | IOA % by wt | AA % by wt | Regalrez 6108 % by wt | PVSSQ % by wt | Total UV Exposure mJ/cm$^2$ | Shear Holding Power, Test Method 4 (min) | 180° Peel Adhesion to Stainless Steel, Test Method 1, (oz/in, N/dm) |
|---|---|---|---|---|---|---|---|
| EX-8 | 83.9 | 5.9 | 9.1 | 0.9 | 2839 | 8,128 | 40.1, 43.9 |

EXAMPLES 9A AND 9B (EX-9A AND EX-9B)

A quart (about 500 mL) jar was charged with: 1) 405 g of IOA; 2) 43.8 g of AA; and 3) 0.18 g of IRG651. The monomer mixture was purged with nitrogen for 5 minutes then exposed to low intensity ultraviolet radiation until a coatable pre-polymer syrup was prepared. In each of two jars (16 oz, ~473 mL per jar), 200 g of the initial syrup composition, a quantity of PVSSQ (see PE-1, above) according to Table 10, and 0.38 g of IRG651 were placed. EX-9A and EX-9B were then "filled" by adding 3.4 g of WACKER HDK H15 fumed silica, mixing with a NETZSCH MODEL 50 DISPERSATOR (available from Netzsch Premier Technologies, LLC, Bangor, Mich.), and then adding 16 g of K15 GLASS BUBBLES (3M Company, St. Paul, Minn.). Both pre-adhesive formulations were mixed thoroughly by rolling overnight and then coated between release liners at 25 mil (635 micrometers) thickness and cured by UVA light with the total dose of UVA light over 10 minutes according to Table 10. Resulting tapes had properties as summarized in Table 10.

TABLE 10

| Ex | IOA % by wt | AA % by wt | K15 % by wt | H15 % by wt | PVSSQ % by wt | Total UV Exposure mJ/cm$^2$ | Shear Holding Power, Test Method 5 min | 90° Peel Adhesion to SS, Test Method 2 lbf/in (N/dm) |
|---|---|---|---|---|---|---|---|---|
| 9A | 86 | 9.3 | 0.7 | 3.4 | 0.4 | 2839 | 10,000+ | 17.2 (301) |
| 9B | 85.8 | 9.3 | 0.7 | 3.4 | 0.7 | 2839 | 10,000+ | 12.7 (222) |

EXAMPLES 10A AND 10B (EX-10A AND EX-10B)

core/outer layer SSQ polymer crosslinkers

A glass jar was charged with 95 grams IOA, 5 gram AA and 0.04 grams of IRG651. The monomer mixture was and then exposed to low intensity ultraviolet light in the same manner as EX-1A until a coatable pre-adhesive polymeric syrup was formed. This forms a master batch, from which 10 g of the syrup was transferred to a smaller glass jar. In that smaller glass jar, the following were further added—0.016 g of IRG651, and 0.04 g of the SSQ core/outer layer polymer of PE-5. The jar was rotated over rubber rollers for 12 hours. The polymeric syrup was then coated between silicone release liners T-10 and T-50 at an approximate thickness of 3 mils (76.2 micrometers) and cured by means of UV-A light at 750 mJ/cm$^2$. The release liner T-10 was then removed and the adhesive was laminated onto a 2 mils (51 micrometers) thick PET (Mitsubishi 3SAB) liner, resulting in the tape for Example 10-A.

Example 10-B was prepared according to the procedure for Example 10-A except that the SSQ core/outer layer polymer of PE-6 was used, as summarized in Table 11.

TABLE 11

| Example | IOA Parts by wt. | AA Parts by wt. | IRG651 Parts by wt. | PE-5 Parts by wt. | PE-6 Parts by wt. | Adhesion to Stainless Steel, 180° Peel Adhesion, Test Method 1 oz/in (N/dm) | Shear Holding Power, Test Method 3 minutes |
|---|---|---|---|---|---|---|---|
| EX-10A | 95 | 5 | 0.2 | 0.4 | — | 42 (46) | 1480 |
| EX-10B | 95 | 5 | 0.2 | — | 0.4 | 35 (39) | 4000+ |

What is claimed is:

1. A pressure sensitive adhesive composition comprising:
   a free-radically polymerizable solvent monomer;
   a solute (meth)acrylic polymer comprising polymerized units derived from
   at least 50 wt.-% of low glass transition temperature (Tg) ethylenically unsaturated monomer having a Tg no greater than 10° C., and
   at least one silsesquioxane polymer crosslinker comprising a plurality of ethylenically unsaturated groups, wherein the silsesquioxane polymer crosslinker comprises a three-dimensional branched network having the formula:

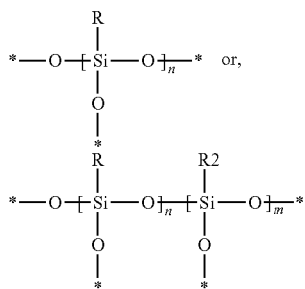

wherein:
   the oxygen atom at the * is bonded to another Si atom within the three-dimensional branched network;
   R is an organic group comprising an ethylenically unsaturated group selected from vinyl ether or alkenyl;
   R2 is an organic group that is not an ethylenically unsaturated group; and
   n is at least 2 and m is at least 1.

2. The pressure sensitive adhesive composition of claim 1 wherein the low Tg ethylenically unsaturated monomer is an alkyl (meth)acrylate comprising 4 to 20 carbon atoms.

3. The pressure sensitive adhesive composition of claim 1 wherein the composition comprises a bio-based content of at least 25% of the total carbon content.

4. The pressure sensitive adhesive composition of claim 1 wherein the low Tg ethylenically unsaturated monomer comprises 2-octyl (meth)acrylate.

5. The pressure sensitive adhesive composition of claim 1 wherein the composition further comprises filler.

6. The pressure sensitive adhesive composition of claim 5 wherein the filler comprises fumed silica, glass bubbles, or a combination thereof.

7. The pressure sensitive adhesive composition of claim 1 wherein the composition further comprises a tackifier, a plasticizer, or a mixture thereof.

8. The pressure sensitive adhesive composition of claim 1 wherein the solute (meth)acrylic polymer further comprises polymerized units of at least one monomer selected from acid-functional monomers, non-acid functional polar monomers, vinyl monomers, and combinations thereof.

9. The pressure sensitive adhesive composition of claim 1 wherein the composition comprises 0.1 to 20 wt. % of the silsesquioxane polymer crosslinker.

10. The pressure sensitive adhesive composition of claim 1 wherein R has the formula Y-Z or Z, wherein Y is the depicted covalent bond or Y is a divalent organic linking group, and Z is vinyl ether or alkenyl.

11. The pressure sensitive adhesive composition of claim 1 wherein R2 has the formula Y-X, wherein Y is the depicted covalent bond or Y is a divalent organic linking group, and X is hydrogen; alkyl, aryl, alkaryl, aralkyl that optionally comprise substituents; or a reactive group that is not an ethylenically unsaturated group.

12. The pressure sensitive adhesive composition of claim 1 wherein n and m are no greater than 500.

13. The pressure sensitive adhesive composition of claim 1 wherein the silsesquioxane polymer crosslinker comprises a core comprising a first silsesquioxane polymer and an outer layer comprising a second silsesquioxane polymer bonded to the core wherein the core, outer layer, or a combination thereof comprises the plurality of ethylenically unsaturated groups.

14. The pressure sensitive adhesive composition of claim 13 wherein the outer layer is bonded to the core via silicon atoms boned to three oxygen atoms.

15. The pressure sensitive adhesive composition of claim 1 wherein the silsesquioxane polymer crosslinker comprises terminal groups having the formula —Si(R$^3$)$_3$ wherein R$^3$ is independently selected from alkyl, aryl, aralkyl, or alkaryl that optionally comprise substituents.

16. The pressure sensitive adhesive composition of claim 1 wherein the silsesquioxane polymer crosslinker comprise —OH groups present in an amount of no greater than 5 wt-% of the silsesquioxane polymer.

17. A crosslinked composition comprising the pressure sensitive adhesive composition of claim 1; wherein the composition is free-radically cured.

18. A pressure sensitive adhesive article comprising the pressure sensitive adhesive composition of claim 1 on a substrate; wherein the composition is free-radically cured.

* * * * *